(12) United States Patent (10) Patent No.: US 7,769,358 B2
Sasaki et al. (45) Date of Patent: Aug. 3, 2010

(54) RADIO SYSTEM, RADIO TRANSMITTER, AND RADIO RECEIVER

(75) Inventors: Makoto Sasaki, Kanagawa (JP); Takashi Enoki, Kanagawa (JP); Katsumi Iizuka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 986 days.

(21) Appl. No.: 10/593,709

(22) PCT Filed: Mar. 23, 2005

(86) PCT No.: PCT/JP2005/005268

§ 371 (c)(1),
(2), (4) Date: Sep. 21, 2006

(87) PCT Pub. No.: WO2005/093962

PCT Pub. Date: Oct. 6, 2005

(65) Prior Publication Data

US 2008/0233879 A1 Sep. 25, 2008

(30) Foreign Application Priority Data

Mar. 25, 2004 (JP) ............................. 2004-089725
Mar. 22, 2005 (JP) ............................. 2005-082443

(51) Int. Cl.
*H04B 1/00* (2006.01)

(52) U.S. Cl. ............. 455/276.1; 455/278.1; 455/139; 455/42; 375/148

(58) Field of Classification Search ............. 455/276.1, 455/278.1, 139, 42, 205, 23, 60, 67.17, 304; 375/148, 150

See application file for complete search history.

(56) References Cited

U.S. PATENT DOCUMENTS 4,384,304 A * 5/1983 Ohta et al. .................. 348/464
4,823,293 A * 4/1989 Oda ............................... 708/5
5,594,467 A * 1/1997 Marlton et al. .............. 345/641
6,009,073 A 12/1999 Kaneko
6,563,859 B1 * 5/2003 Oishi et al. .................. 375/148

(Continued)

FOREIGN PATENT DOCUMENTS

CN 1389039 1/2003

(Continued)

OTHER PUBLICATIONS

Chinese Office Action dated Oct. 17, 2008 with English translation.
PCT International Search Report dated Jun. 7, 2005.
Japanese Office Action Dated Mar. 27, 2007 with English translation.

*Primary Examiner*—Minh D Dao
(74) *Attorney, Agent, or Firm*—Dickinson Wright PLLC

(57) ABSTRACT

A radio system having an improved phase noise characteristic and a thereby improved communication quality, a radio transmitter, and a radio receiver. In the radio system, a radio transmitter (101) transmits a multiplexed signal so multiplexed that a pilot signal transmitted at the center frequency. A radio receiver (151) comprises an antenna (152) for receiving a radio signal from the radio transmitter (101), a distributor (159) for distributing the received signal received by the antenna (152) to two directions, a bandpass filter (160) for extracting a signal component corresponding to the pilot signal having the same center frequency as one of the distributed signals distributed by the distributor (159), a delay corrector (162) for delaying the other of the distributed signals, and a quadrature demodulator (163) for multiplying the frequency of the signal component corresponding to the pilot signal extracted by the bandpass filter (160) by the frequency of the other signal delayed by the delay corrector (162) and performing quadrature demodulation.

11 Claims, 15 Drawing Sheets

U.S. PATENT DOCUMENTS

| | | |
|---|---|---|
| 7,570,110 B2 * | 8/2009 | Brilka .................. 329/357 |
| 2001/0022821 A1 | 9/2001 | Ichihara |
| 2002/0154616 A1 | 10/2002 | Aoyama |
| 2003/0109242 A1 | 6/2003 | Ohtaki |
| 2003/0179776 A1 | 9/2003 | Sumasu et al. |
| 2004/0109691 A1 * | 6/2004 | Miyazaki .................. 398/98 |
| 2008/0009726 A1 * | 1/2008 | Bae et al. .................. 600/437 |
| 2008/0233878 A1 * | 9/2008 | Iizuka et al. .................. 455/42 |
| 2010/0014862 A1 * | 1/2010 | Suzuki .................. 398/79 |

FOREIGN PATENT DOCUMENTS

| | | |
|---|---|---|
| JP | 3268616 | 11/1991 |
| JP | 6291553 | 10/1994 |
| JP | 9153882 | 6/1997 |
| JP | 118604 | 1/1999 |
| JP | 2000232325 | 8/2000 |
| JP | 2001156726 | 6/2001 |
| JP | 2001268145 | 9/2001 |
| JP | 200244064 | 2/2002 |
| JP | 200244175 | 2/2002 |
| JP | 200294402 | 3/2002 |
| JP | 2002152158 | 5/2002 |
| JP | 200387218 | 3/2003 |
| JP | 2003179530 | 6/2003 |
| JP | 2003179531 | 6/2003 |

* cited by examiner

RADIO SYSTEM, RADIO TRANSMITTER, AND RADIO RECEIVER

TECHNICAL FIELD

The present invention relates to a radio system, radio transmission apparatus and radio reception apparatus, and more particularly, to a radio system, radio transmission apparatus and radio reception apparatus having an excellent phase noise characteristic.

BACKGROUND ART

Conventionally, various measures are adopted to provide a radio system having an excellent phase noise characteristic. An example of this conventional radio system having an excellent phase noise characteristic is described in Patent Document 1. This radio system is provided with a local noise canceller shown in FIG. 14 to improve its phase noise characteristic.

The operation of this local noise canceller will be explained with reference to FIG. 14 and FIG. 15. FIG. 15 shows characteristic diagrams illustrating frequency characteristics of the respective components of the local noise canceller shown in FIG. 14.

As shown in FIG. 15A, suppose that an input signal consists of a modulated IF signal (BST-OFDM) multiplexed with pilot carrier (PILOT) and input phase noise (part expressed by bold hatching) is superimposed thereon.

Here, when it is assumed that the frequency of the input pilot carrier is $f_{PLT}$, frequency of the input signal is $f_{sig}$ and input phase noise is $\theta(t)$, input phase noise $\theta(t)$ is superimposed on $f_{PLT}$ and $f_{sig}$, and therefore they are expressed as follows:

$f_{PLT} \angle \theta(t)$ $f_{sig} \angle \theta(t)$

Input signal A is distributed by distributor 50 and one portion is output to a pilot branch and the other to a signal branch. In the pilot branch, the one signal distributed by distributor 50 is band-limited by band pass filter 51, only a pilot carrier component thereof is allowed to pass and extracted and further subjected to limiter amplification by limiter amplifier 52.

At this time, the IF signal component is removed from the frequency characteristics of output signal B from band pass filter 51 and output signal C from limiter amplifier 52 as shown in FIG. 15B, 15C, and only the pilot carrier component and input phase noise $\theta(t)$ superimposed thereon remain.

At this time, a delay is produced at band pass filter 51 and if this delay time is assumed to be $\tau_{BPF1}$, input phase noise $\theta(t-\tau_{BPF1})$ delayed by $\tau_{BPF1}$ is superimposed on input pilot carrier frequency $f_{PLT}$, and therefore $f_{PLT}$ is expressed as follows:

$f_{PLT} \angle \theta(t-\tau_{BPF1})$

On the other hand, in the signal branch, local oscillation signal D is output from local oscillator 60. Here, the frequency characteristic of local oscillation signal D output from local oscillator 60 consists of a signal of local oscillation frequency (LO) and phase noise originating in the system which is superimposed thereon as shown in FIG. 15D.

Here, if it is assumed that the local oscillation signal frequency in the system is $f_{LO}$ and the local oscillation signal phase noise in the system is $\phi(t)$, local oscillation signal phase noise $\phi(t)$ in the system is superimposed on the local oscillation signal frequency $f_{LO}$ in the system, and therefore $f_{LO}$ is expressed as follows:

$f_{LO} \angle \phi(t)$

In the signal branch, the frequency of the signal output from distributor 50 is converted by frequency converter 61 using local oscillation signal D from local oscillator 60 and signal E is output.

Here, the frequency characteristic of signal E output from frequency converter 61 includes a sum component and difference component between input signal A and local oscillation signal D as shown in FIG. 15E. Thus, relationships between the respective signal components included in signal E and phase noise to be superimposed thereon are expressed as follows:

$f_{PLT} - f_{LO} \angle \theta(t) - \phi(t)$ $f_{sig} - f_{LO} \angle \theta(t) - \phi(t)$ $f_{PLT} + f_{LO} \angle \theta(t) + \phi(t)$ $f_{sig} + f_{LO} \angle \theta(t) + \phi(t)$ Frequency-converted signal E is band-limited by band pass filter 62 so that only the difference component passes, and therefore it is output from band pass filter 62 as signal F and the frequency characteristic of signal F is deprived of the sum component in E and only the difference component exists as shown in FIG. 15F.

At this time, a delay is produced at band pass filter 62 and if this delay time is assumed to be $\tau_{BPF2}$, delay $\tau_{BPF2}$ is produced in the phase noise superimposed on the extracted difference component and relationships between the respective signal components included in signal F and phase noise to be superimposed thereon are expressed as follows:

$f_{PLT} - f_{LO} \angle \theta(t-\tau_{BPF2}) - \phi(t-\tau_{BPF2})$ $f_{sig} - f_{LO} \angle \theta(t-\tau_{BPF2}) - \phi(t-\tau_{BPF2})$ A delay is then added to signal F by delay compensator 63 so as to be equivalent to the delay time at band pass filter 51 in the pilot branch and the signal with the delay is output as signal G.

Here, when it is assumed that the delay time of band pass filter 62 with respect to delay time $\tau_{BPF1}$ of band pass filter 51 is $\tau_{BPF2}$ and the delay time at delay compensator 63 is $\Delta t$, delay compensator 63 adds delay $\Delta t$ to signal F in such a way that $\tau_{BPF1} = \tau_{BPF2} + \Delta t$ to equalize the delay time difference between the signal branch and pilot branch.

As a result, the frequency characteristic of signal G does not change as shown in FIG. 15G and relationships between the respective signal components included in signal G and phase noise to be superimposed thereon consist of phase noise plus delay $\Delta t$ as follows:

$f_{PLT} - f_{LO} \angle \theta(t-\tau_{BPF2} - \Delta t) - \phi(t-_{BPF2} - \Delta t)$ $f_{sig} - f_{LO} \angle \theta(t-\tau_{BPF2} - \Delta t) - \phi(t-\tau_{BPF2} - \Delta t)$ Signal G in the signal branch and signal C in the pilot branch output from above described limiter amplifier 52 are frequency-converted by frequency converter 70 and output as signal H.

Here, the frequency characteristic of signal H output from frequency converter 70 includes the sum component and difference component between signal G and signal C as shown in FIG. 15H. Therefore, relationships between the respective signal components included in signal H and phase noise to be superimposed thereon are expressed as follows:

$$f_{PLT}-(f_{PLT}-f_{LO})\angle\theta(t-\tau_{BPF1})-\{\theta(t-\tau_{BPF2}-\Delta t)-\phi(t-\tau_{BPF2}-\Delta t)\}$$

$$f_{PLT}-(f_{sig}-f_{LO})\angle\theta(t-\tau_{BPF1})-\{\theta(t-\tau_{BPF2}\Delta t)-\phi(t-\tau_{BPF2}-\Delta t)\}$$

$$f_{PLT}+(f_{PLT}-f_{LO})\angle\theta(t-\tau_{BPF1})+\{\theta(t-\tau_{BPF2}-\Delta t)-\phi(t-\tau_{BPF2}-\Delta t)\}$$

$$f_{PLT}+(f_{sig}-f_{LO})\angle\theta(t-\tau_{BPF1})+\{\theta(t-\tau_{BPF2}-\Delta t)-\phi(t-\tau_{BPF2}-\Delta t)\}$$

Here, as shown above, delay compensator 63 adds delay $\Delta t$ in such a way that:

$$\tau_{BPF1}-\tau_{BPF2}-\Delta t$$

to equalize the delay time difference between the signal branch and pilot branch, and therefore the expression can be organized as follows:

$$f_{LO}\angle\theta(t-\tau_{BPF2}-\Delta t)$$

$$f_{LO}-(f_{sig}-f_{PLT})\angle\phi(t-\tau_{BPF2}-\Delta t)$$

$$2\times f_{PLT}-f_{LO}\angle 2\times\theta(t-\tau_{BPF1})-\phi(t-\tau_{BPF2}-\Delta t)$$

$$f_{PLT}+(f_{sig}-f_{LO})\angle 2\times\theta(t-\tau_{BPF1})-\phi(t-\tau_{BPF2}-\Delta t)$$

Here, if attention is focused on the difference component, the frequency of the output signal component is frequency ($f_{LO}$) of the local oscillation signal in the system irrespective of the frequency of the input signal, that is, constant. Furthermore, the side band of the signal when focused on the pilot carrier is reversed between the input and output.

Furthermore, input phase noise $\theta(x)$ is canceled and the phase noise of the output signal becomes phase noise $\phi(x)$ of the local oscillation signal in the system instead. That is, it is understandable that when phase noise $\phi(x)$ of the local oscillation signal in the system is small enough, the phase noise of the input signal is sufficiently reduced and output.

Thus, signal H frequency-converted by frequency converter 70 is band-limited by band pass filter 71 so that only the difference component passes and signal I is output so that only the signal component passes, and the frequency characteristic of signal I is deprived of the sum component in H and the pilot carrier component in the difference component as shown in FIG. 15I, includes only the signal component of the difference component and the relationship between the signal component included in signal I and phase noise to be superimposed thereon is as follows:

$$f_{LO}-(f_{sig}-f_{PLT})\angle\phi(t-\tau_{BPF2}-\Delta t)$$

Based on the principles of frequency synchronization and noise cancellation by the above described local noise canceller, even if a frequency deviation is produced on an input signal, for example, it is possible to obtain an output signal at a frequency following the local oscillation frequency having a high degree of stability with high frequency accuracy generated by local oscillator 60 and thereby eliminate the frequency deviation of the input signal.

Furthermore, with phase noise $\theta(x)$ superimposed on the input signal canceled, the phase noise of the output signal becomes only phase noise $\phi(x)$ of the local oscillation signal in the system instead, and therefore if phase noise $\phi(x)$ of the local oscillation signal in the system is small enough, the phase noise of the input signal is sufficiently reduced and output.

[Patent Document 1] Japanese Patent Application Laid-Open No. 2002-152158

DISCLOSURE OF INVENTION

Problems to be Solved by the Invention

However, phase noise $\theta(x)$ generated from local oscillator 60 is not canceled in the conventional radio system and phase noise increases at a rate of 20*log (corresponds to a multiple of the frequency), and therefore when the frequency of local oscillator 60 is high, there is a problem that communication quality deteriorates due to influences of phase noise $\theta(x)$.

It is an object of the present invention to provide a radio system, radio transmission apparatus and radio reception apparatus that improves the phase noise characteristics and thereby improves communication quality.

Means for Solving the Problem

The radio system of the present invention adopts a configuration comprising a radio transmission apparatus provided with a transmission section that transmits a radio signal which multiplexes a modulated signal without the signal being carried on a center frequency and a pilot signal having a center frequency identical to the center frequency, and a radio reception apparatus provided with an antenna that receives the radio signal, a distribution section that distributes the received signal received by the antenna into two directions, an extraction section that extracts a signal component corresponding to the pilot signal from one signal distributed by the distribution section and outputs the signal component, a delay addition section that gives a delay to the other signal distributed by the distribution section and outputs the signal, and a quadrature demodulation section that frequency-multiplies the output signal of the extraction section by the output signal of the delay addition section and carries out quadrature demodulation.

The radio reception apparatus of the present invention adopts a configuration comprising an antenna that receives a radio signal which multiplexes a modulated signal without the signal being carried on a center frequency and a pilot signal having a center frequency identical to the center frequency, a distribution section that distributes the received signal received by the antenna into two directions, an extraction section that extracts a signal component corresponding to the pilot signal having a center frequency identical to the center frequency from one signal distributed by the distribution section, a delay addition section that gives a delay to the other received signal distributed by the distribution section, and a quadrature demodulation section that frequency-multiplies a signal component corresponding to the pilot signal extracted by the extraction section by the other signal with a delay added thereto by the delay addition section and carries out quadrature demodulation.

The radio transmission apparatus of the present invention is a radio transmission apparatus that transmits a multiplexed signal which multiplexes a modulated signal without the signal being carried on a center frequency and a pilot signal having a center frequency identical to the center frequency, which adopts a configuration comprising a modulated signal generation section that generates the modulated signal, a local oscillation signal generation section that generates a local oscillation signal, a quadrature modulation section that frequency-multiplies the modulated signal using the local oscillation signal generated by the local oscillation signal generation section, increases the frequency and performs quadrature modulation, a delay addition section that adds a delay to the local oscillation signal generated by the local oscillation signal generation section and a combiner that multiplexes a signal after the quadrature demodulation by the quadrature demodulation section with a local oscillation signal as the pilot signal with a delay added by the delay addition section so that the phases of the signals match after the quadrature demodulation.

ADVANTAGEOUS EFFECT OF THE INVENTION

According to the present invention, it is possible to provide a radio system, radio transmission apparatus and radio reception apparatus which improves phase noise characteristics and thereby improves communication quality.

BEST MODE FOR CARRYING OUT THE INVENTION

With reference now to the attached drawings, embodiments of the present invention will be described in detail below.

Embodiment 1

First of all, a radio system according to this embodiment will be explained with reference to the attached drawings.

Figure 1:
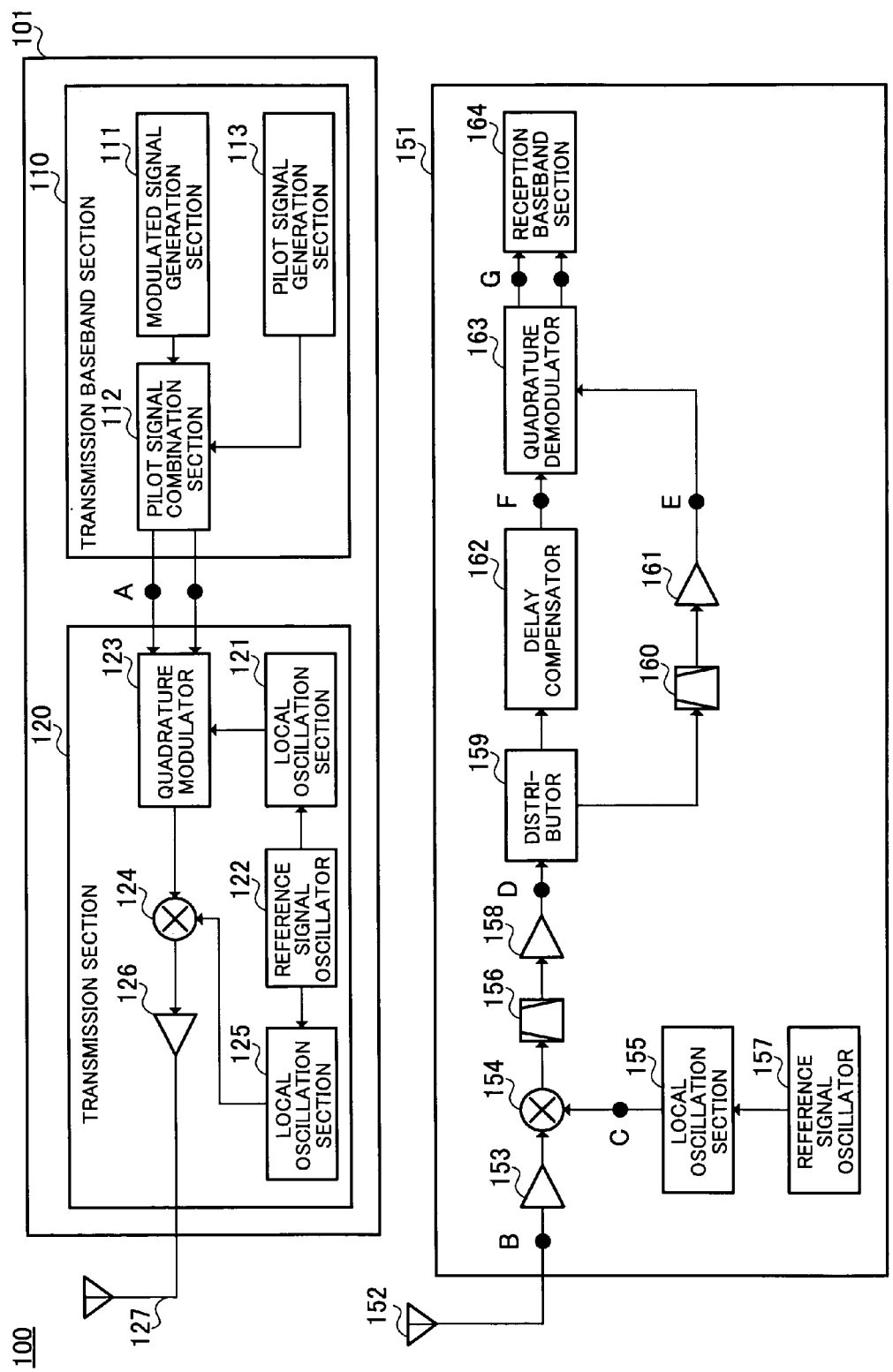
FIG. 1 is a block diagram showing the configuration of a radio system according to Embodiment 1 of the present invention.

FIG. 1 is a block diagram showing the configuration of a radio system according to this embodiment. As shown in FIG. 1, radio system 100 is provided with radio transmission apparatus 101 and radio reception apparatus 151.

This radio transmission apparatus 101 is provided with transmission baseband section 110 that generates a baseband signal and transmission section 120 that applies predetermined processing to the baseband signal and transmits it as an RF signal.

In this transmission baseband section 110, modulated signal generation section 111 generates a modulated signal and gives it to pilot signal combination section 112. Here, the modulated signal will be explained as multicarrier CDMA, but any type of modulated signal can be handled if it is at least not carried on a center frequency part on the frequency axis and it can be, for example, an OFDM signal.

This pilot signal combination section 112 combines the modulated signal (M-CDMA) received from modulated signal generation section 111 and a pilot signal (PILOT) received from pilot signal generation section 113 and gives the combined signal to transmission section 120.

Here, the pilot signal is positioned at the center of the modulated signal on the frequency axis and when the frequency of the pilot signal is assumed to be $f_{PILOT}$, $f_{PILOT}=0$ [Hz].

On the other hand, in transmission section 120, local oscillation section 121 generates a local oscillation signal using a reference signal generated from reference signal oscillator 122 and gives the local oscillation signal to quadrature modulator 123.

Quadrature modulator 123 carries out quadrature modulation on the combined signal of the modulated signal and pilot signal output from pilot signal combination section 112 of above described transmission baseband section 110 using the local oscillation signal from local oscillation section 121 and gives the quadrature-modulated signal to multiplier 124.

Multiplier 124 converts the signal quadrature-modulated by quadrature modulator 123 to a radio signal using a local oscillation signal received from local oscillation section 125. This radio signal is amplified by amplifier 126 and transmitted through antenna 127. Here, local oscillation section 125 generates a local oscillation signal using a reference signal generated from reference signal oscillator 122 and the local oscillation signals generated by local oscillation section 121 and local oscillation section 125 are synchronized with each other.

On the other hand, antenna 152 of radio reception apparatus 151 receives the radio signal transmitted from radio transmission apparatus 101. This received radio signal is amplified by amplifier 153 and then given to multiplier 154.

Multiplier 154 converts the frequency of the radio signal amplified by amplifier 153 using a local oscillation signal generated from local oscillation section 155 and gives the signal to band pass filter 156. Local oscillation section 155 oscillates a local oscillation signal using a reference signal generated from reference signal oscillator 157.

Band pass filter 156 extracts only a signal of a desired frequency band from the signal frequency-converted by multiplier 154. The signal extracted by band pass filter 156 is amplified by amplifier 158 and then given to distributor 159.

Distributor 159 distributes the signal received from band pass filter 156 through amplifier 158 into two routes of a modulated signal branch and a pilot branch.

In the pilot branch, band pass filter 160 extracts only a pilot signal component from the signal distributed by distributor 159. This extracted pilot signal component is amplified by amplifier 161 and then given to quadrature demodulator 163. Here, attempting to keep the input signal level for quadrature demodulator 163 through only the pilot branch, that is, only amplifier 161 causes distortion only in the pilot branch and causes phase noise to remain in the output of quadrature demodulator 163. Thus, if it is assumed that the input signal level for distributor 159 is Pin[dBm], power loss by distributor 159 is α[dB], power loss of bandpass filter 160 is β[dB] and the gain of amplifier 161 is γ[dB], then input signal level Pin for distributor 159 is set so that it is substantially proportional to the output level (Pin+γ−α−β) of amplifier 161. Such a setting can prevent distortion in the pilot branch.

On the other hand, in the modulated signal branch, delay compensator 162 causes the signal received from distributor 159 to delay so as to be synchronized with the signal which arrives at quadrature demodulator 163 through the pilot branch and gives it to quadrature demodulator 163.

Quadrature demodulator 163 performs multiplication between the signals received from the pilot branch and the modulated signal branch, performs quadrature demodulation on the multiplication result and gives it to reception baseband section 164.

Next, the operation of radio system 100 will be explained with reference to FIG. 1 and FIG. 2.

FIG. 2 shows characteristic diagrams illustrating a frequency characteristic of each signal at radio system 100. FIGS. 2A to 2G show frequency characteristics of signals assigned corresponding letters of the alphabet in FIG. 1.

Figure 2A:
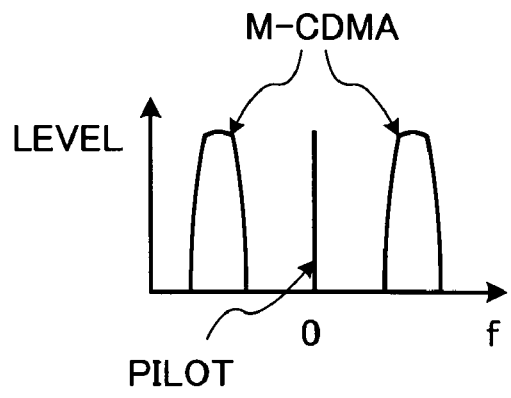
FIG. 2 is a characteristic diagram showing frequency characteristics of each signal in the radio system.

Combined signal A of the modulated signal and pilot signal output from baseband section 110 has a frequency characteristic shown in FIG. 2A. As described above, here the pilot signal is positioned at the center of the modulated signal on the frequency axis and if the frequency of the pilot signal is assumed to be $f_{PILOT}$, $f_{PILOT}=0$ [Hz].

Combined signal A is frequency-converted to a radio signal and output from antenna 127.

Radio frequency $f_{RF}$ of the modulated signal and radio frequency $f_{RF\_PILOT}$ of the pilot signal included in the radio signal output from antenna 127 are expressed as follows:

$$f_{RF}=f_{CDMA}+f_{Lo1}+f_{Lo2}$$

$$f_{RF\_PIPOT}=f_{PILOT}+f_{Lo1}+f_{Lo2}$$

Here, suppose the frequency of the modulated signal generated by modulated signal generation section 111 is $f_{CDMA}$, the frequency of the local oscillation signal oscillated by local oscillation section 125 is $f_{Lo1}$, and the frequency of the local oscillation signal oscillated by local oscillation section 121 is $f_{Lo2}$.

Here, in transmission section 120, phase noise of local oscillation section 121 at quadrature modulator 123 and phase noise of local oscillation section 125 at multiplier 124 are superimposed on combined signal A and the signal is output as a radio signal. Furthermore, phase noise is also superimposed on the radio signal in a transmission path after the signal is output from antenna 127 until it is received by antenna 152.

Figure 2B:
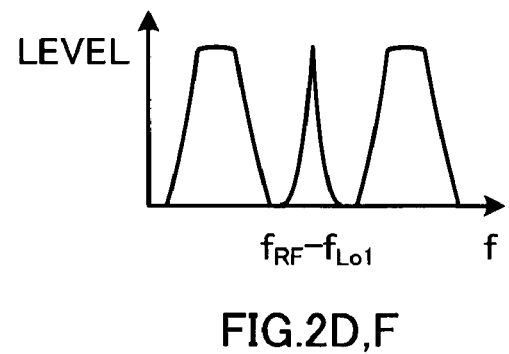
Figure 2B:
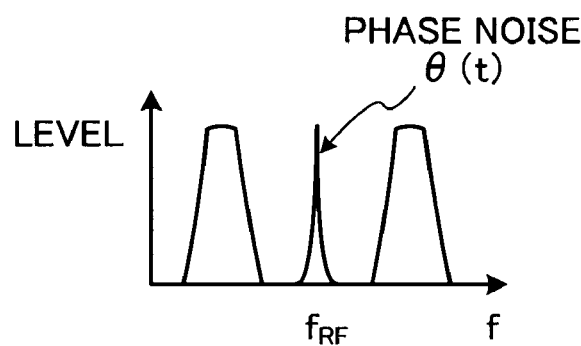

Therefore, if the sum total of phase noise superimposed in transmission section 120 and transmission path is θ(t), radio signal B received by antenna 152 has a frequency characteristic shown in FIG. 2B and is expressed as follows:

$$f_{RF}\angle\theta(t)$$

$$f_{RF\_PILOT}\angle\theta(t)$$

Figure 2E:
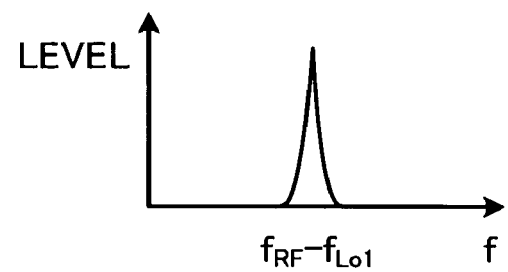
Figure 2C:
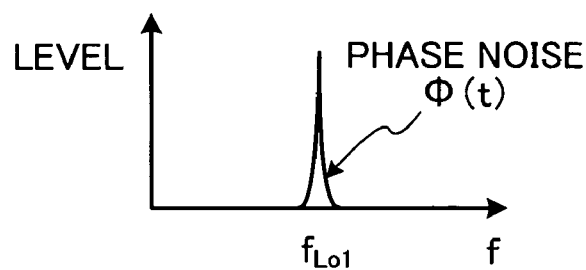

Radio signal B received by antenna 152 is amplified by amplifier 153 and frequency-converted by multiplier 154. Here, local oscillation section 155 oscillates a local signal having phase noise φ(t), and therefore this local signal has the frequency characteristic as shown in FIG. 2C and is expressed as follows:

$$f_{Lo1}\angle\phi(t)$$

For this reason, phase noise φ(t) of local oscillation section 155 is superimposed on the signal frequency-converted by multiplier 154 and given to band pass filter 156.

The bandwidth of this band pass filter 156 is set in such a way that the frequencies of the difference components output from multiplier 154, that is, $f_{RF}-f_{Lo1}$ and $f_{RF\_PILOT}-f_{Lo1}$ are extracted. For this reason, signal D output from amplifier 158 has a frequency characteristic shown in FIG. 2D and is expressed as follows:

$$f_{RF}-f_{Lo1}\angle\theta(t)-\phi(t)$$

$$f_{RF\_PILOT}-f_{Lo1}\angle\theta(t)-\phi(t)$$

Next, signal D is distributed by distributor 159, one is output to the modulated signal branch and the other is output to the pilot branch.

In the pilot branch, band pass filter 156 is set so as to extract only the pilot signal component, and therefore band pass filter 156 extracts only the pilot signal component from distributed signal D and outputs the pilot signal component.

At this time, delay $\tau_1$ is superimposed on signal D when the pilot signal component passes through band pass filter 160 and amplifier 161. For this reason, output signal E of amplifier 161 has a frequency characteristic as shown in FIG. 2E and is expressed as follows:

$$f_{RF\_PILOT}-f_{Lo1}\angle\theta(t-\tau_1)-\phi(t-\tau_1)$$

On the other hand, in the modulated signal branch, such a delay as $\Delta t=\tau_1+\tau_2$ is superimposed on signal D by delay compensator 162. Note that $\tau_2$ is a delay generated in quadrature demodulator 163, which will be described later. For this reason, signal F output from delay compensator 162 has a frequency characteristic as shown in FIG. 2F and can be expressed by the following expression:

$$f_{RF}-f_{Lo1}\angle\theta(t-\Delta t)-\phi(t-\Delta t)$$

Figure 3:
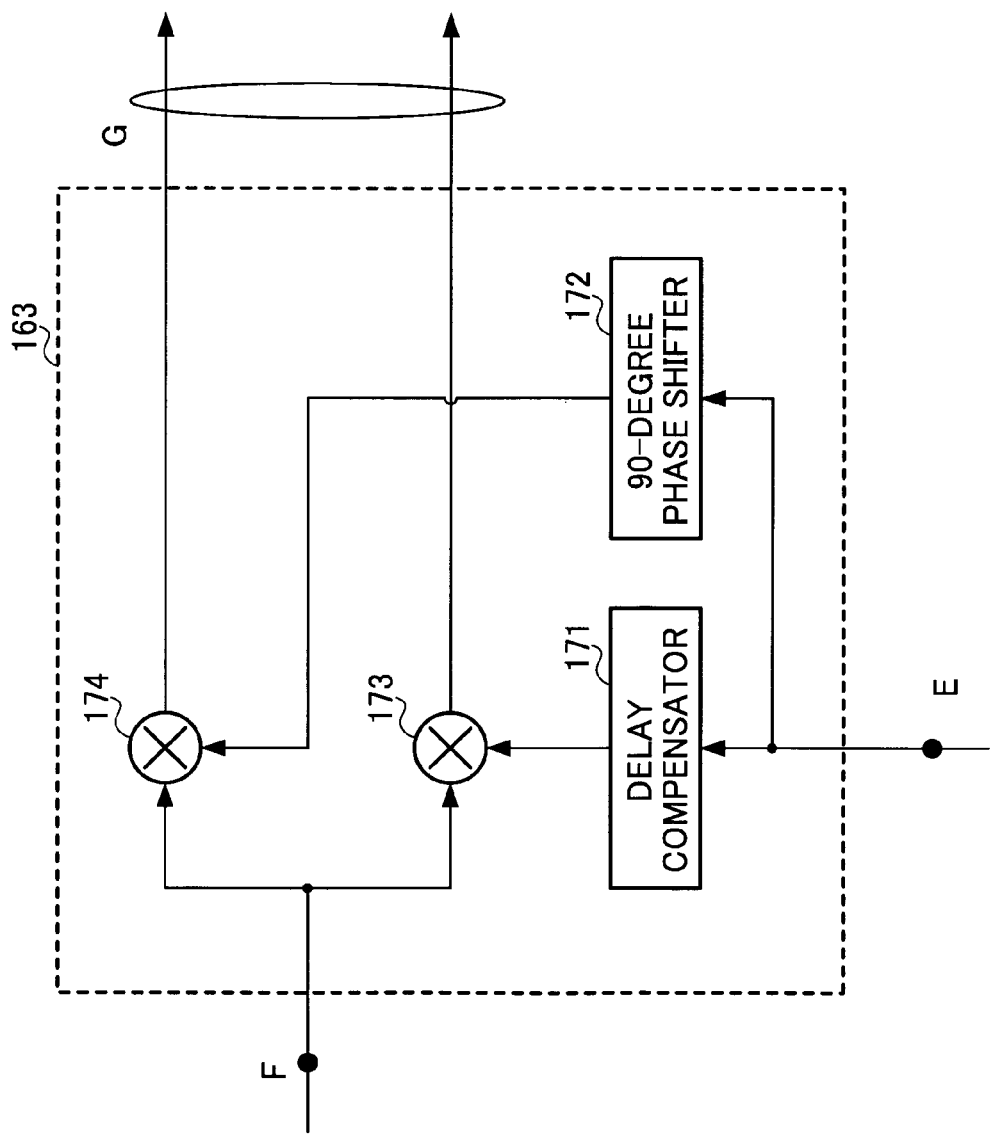
FIG. 3 illustrates the configuration of a quadrature modulator in the radio reception apparatus shown in FIG. 1.

Signal E is multiplied by signal F at quadrature demodulator 163 and then subjected to quadrature demodulation. More specifically, this quadrature demodulator 163 includes delay compensator 171, 90-degree phase shifter 172, multiplier 173 and multiplier 174 as shown in FIG. 3.

Signal E is input to delay compensator 171 and 90-degree phase shifter 172. 90-degree phase shifter 172 shifts the phase of signal E by 90 degrees and outputs the signal to multiplier 174. At this time, delay $\tau_2$ is generated at 90-degree phase shifter 172.

Delay compensator 171 compensates signal E so as to produce delay $\tau_2$ which is equivalent to the delay generated by 90-degree phase shifter 172.

Signal F is input to multiplier 173 and multiplier 174, multiplied by the output signals from delay compensator 171 and 90-degree phase shifter 172 respectively and output as signal G. This signal F has also been compensated at delay compensator 162 with amount of delay 12 in quadrature demodulator 163 taken into consideration, and therefore the signals multiplied at multiplier 173 and multiplier 174 have an identical phase. It is thereby possible to realize ideal demodulation.

Figure 2G:
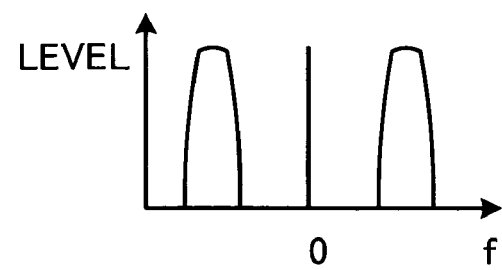

Therefore, signal G output from quadrature demodulator 163 has a frequency characteristic as shown in FIG. 2G and can be expressed by the following expression:

$$(f_{RF}-f_{Lo1})-(f_{RF\_PILOT}-f_{Lo1})$$

$$\angle \theta(t-\tau_1-\tau_2)-\phi(t-\tau_1-\tau_2)-\{\theta(t-\Delta t)-\phi(t-\Delta t)\}$$

This is organized using a condition $f_{PILOT}=0$ Hz and $\Delta t=\tau_1+\tau_2$ as follows:

$$f_{CDMA}\angle 0$$

This means that phase noise superimposed at transmission section 120, transmission path and local oscillation section 155 has been completely canceled and the modulated signal generated at modulated signal generation section 111 has been demodulated at radio reception apparatus 151. That is, it is possible to cancel not only phase noise superimposed on the received signal but also phase noise generated in the system of the reception radio section.

As described above, radio transmission apparatus 101 transmits a signal multiplexed in such a way that a pilot signal is carried on the center frequency of the transmission signal, radio reception apparatus 151 performs frequency multiplication using a pilot signal having the same frequency error and phase noise as those of the received signal and also performs frequency multiplication on phase noise generated in the system using a signal having the same phase noise. For this reason, it is possible to remove frequency errors and phase errors included in the received signal and also completely remove phase errors generated in the system and thereby realize a radio system having an excellent phase noise characteristic.

When band pass filter 160 extracts a pilot signal, it cannot extract phase noise outside the frequency band of band pass filter 160, and therefore the phase noise is included in the frequency characteristic shown in FIG. 2G. However, this phase noise can be suppressed by local oscillation section 121, local oscillation section 125 and local oscillation section 155.

For example, local oscillation section 155 is constructed as a PLL frequency synthesizer and the loop bandwidth is designed to be not greater than the bandwidth of band pass filter 160. By so doing, it is possible to suppress phase noise $\phi(t)$ outside the pass band of band pass filter 160 shown in FIG. 2C and thereby ignore influences thereof. Note that local oscillation section 121 and local oscillation section 125 can also suppress phase noise $\theta(t)$ outside the frequency band of band pass filter 160 in the same way.

Furthermore, in this embodiment, a signal having the same frequency ($f_{Lo1}$) as that of the local oscillation signal oscillated by local oscillation section 125 at radio transmission apparatus 101 is used as a local frequency oscillated by local oscillation section 155 of radio reception apparatus 151, but the signal only needs to have a frequency which does not exceed 2×RF frequency ($f_{Lo1}+f_{Lo2}$) and is different from an the RF frequency, and it goes without saying that it is likewise possible to cancel phase noise using the same frequency ($f_{Lo2}$) as the local oscillation signal oscillated by local oscillation section 121.

Furthermore, this embodiment assumes that the configurations of transmission baseband section 110 and transmission section 120 are based on a superheterodyne scheme, but any scheme can be used if it is at least a scheme capable of transmitting a signal having the frequency characteristic shown in FIG. 2A with a pilot signal disposed at the center of a modulated signal on the frequency axis and can be, for example, direct conversion.

In this way, according to Embodiment 1, radio reception apparatus 151 is provided with antenna 152 that receives a radio signal in which a modulated signal without the signal being carried on the center frequency is multiplexed with a pilot signal having a center frequency identical to the center frequency thereof, distributor 159 that distributes the received signal received from antenna 152 into two directions, band pass filter 160 that extracts from the one received signal distributed from distributor 159 a signal component corresponding to the pilot signal having a center frequency identical to the center frequency thereof, delay compensator 162 that gives a delay to the other signal distributed by distributor 159 and quadrature demodulator 163 that frequency-multiplies the signal component corresponding to the pilot signal extracted by band pass filter 160 by the other signal with a delay added by delay compensator 162 and also performs quadrature demodulation.

By so doing, the radio signal received is a modulated signal with the signal not being carried on a center frequency multiplexed with a pilot signal having a center frequency identical to the above described center frequency, which eliminates the necessity for local oscillation section 60 and frequency converter 61 existing in the signal branch of the local noise canceller shown in the conventional example, and therefore phase noise included in a local oscillation signal generated at this local oscillation section 60 is not carried on a signal (signal F) of the signal branch. For this reason, it is also possible to completely remove phase errors generated in the system and thereby realize a radio system having an excellent phase noise characteristic.

Furthermore, above described quadrature demodulator 163 is provided with 90-degree phase shifter 172 that applies a phase shift of 90 degrees to a signal component corresponding to a pilot signal extracted by band pass filter 160, multiplier 174 that multiplies the signal (signal E) with a delay added thereto by delay compensator 162 by a signal component corresponding to a pilot signal to which a phase shift of 90 degrees is applied, multiplier 173 that multiplies the signal (signal E) with a delay added thereto by delay compensator 162 by a signal component corresponding to the pilot signal extracted by band pass filter 160 and delay compensator 171 that adds a delay equivalent to the delay generated by 90-degree phase shifter 172 to the signal component corresponding to the pilot signal multiplied at multiplier 173.

By so doing, delay compensator 162 sets an amount of delay to be added appropriately, and it is thereby possible to match the phases of signals multiplied at multiplier 173 and multiplier 174.

Embodiment 2

Figure 4:
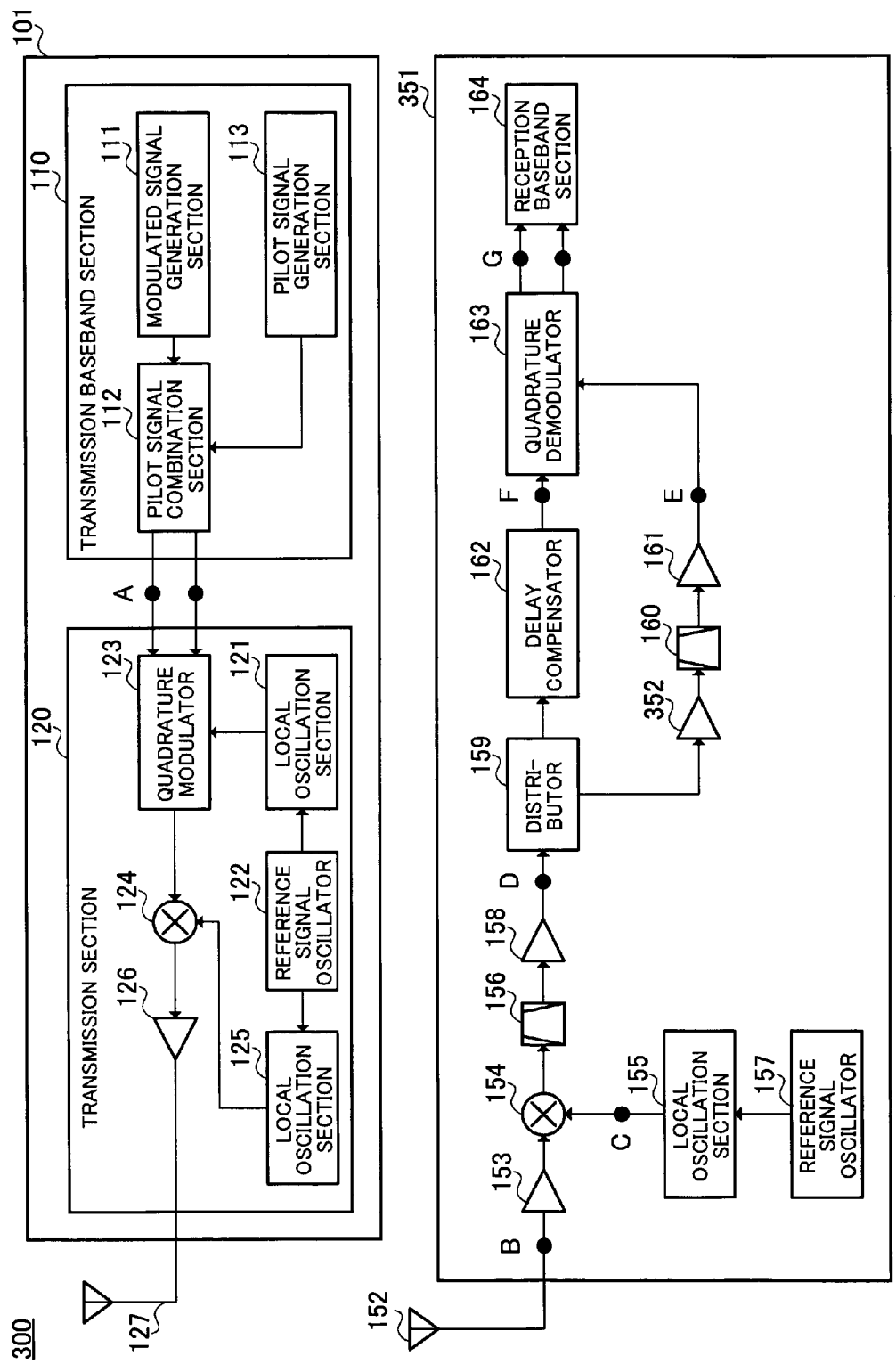
FIG. 4 is a block diagram showing the configuration of a radio system according to Embodiment 2 of the present invention.

FIG. 4 is a block diagram showing the configuration of a radio system according to Embodiment 2 of the present invention. Compared to radio reception apparatus 151 of radio system 100 according to Embodiment 1, radio reception apparatus 351 of radio system 300 shown in FIG. 4 only differs in that amplifier 352 is added between distributor 159 and band pass filter 160 and the rest of the components are the same. Therefore, explanations of the same components will be omitted and only different parts will be explained below.

Noting that when a comparison is made between a modulated signal branch and a pilot signal branch, the pilot signal branch is inferior to the modulated signal branch in an NF characteristic and C/N characteristic when the electric field is weak because the pilot signal branch includes band pass filter 160, this embodiment has added amplifier 352 between distributor 159 and band pass filter 160 in radio reception apparatus 351.

In the pilot branch of radio reception apparatus 351, amplifier 352 amplifies signal D distributed by distributor 159 and gives the amplified signal to band pass filter 160.

Band pass filter 160 extracts only a pilot signal component from the signal amplified by amplifier 352. This extracted pilot signal component is amplified by amplifier 161 and then given to quadrature demodulator 163.

As described above, adding amplifier 352 before band pass filter 160 makes it possible to improve the NF characteristic and C/N characteristic of the pilot branch when the electric field is weak.

It is possible to use a directional coupler or the like to improve the isolation characteristic of distributor 159. Adding amplifier 352 between distributor 159 and band pass filter 160 makes it possible to improve the NF characteristic of the pilot branch and C/N characteristic when the electric field is weak in this case, too.

As described above, it is possible to realize a radio system having an excellent NF characteristic of the pilot branch and C/N characteristic when the electric field is weak, and an excellent phase noise characteristic.

In this way, according to Embodiment 2, radio reception apparatus 351 is provided with antenna 152 that receives a radio signal in which a modulated signal without the signal being carried on the center frequency is multiplexed with a pilot signal having a center frequency identical to the center frequency, distributor 159 that distributes the received signal received from antenna 152 into two directions, band pass filter 160 that extracts from the one received signal distributed from distributor 159 a signal component corresponding to the pilot signal having a center frequency identical to the center frequency thereof, delay compensator 162 that gives a delay to the other signal distributed by distributor 159, and quadrature demodulator 163 that frequency-multiplies the signal component corresponding to the pilot signal extracted by band pass filter 160 by the other signal with a delay added by delay compensator 162 and also performs quadrature demodulation.

Furthermore, radio reception apparatus 351 is provided with amplifier 352 that amplifies the signal (signal for the pilot branch) distributed by distributor 159 and outputs the signal to band pass filter 160.

By so doing, it is possible to improve the NF characteristic and the C/N characteristic when the electric field is weak of the signal (signal E) input to quadrature demodulator 163 through the pilot branch, and thereby further improve the phase noise characteristic.

Embodiment 3

Figure 5:
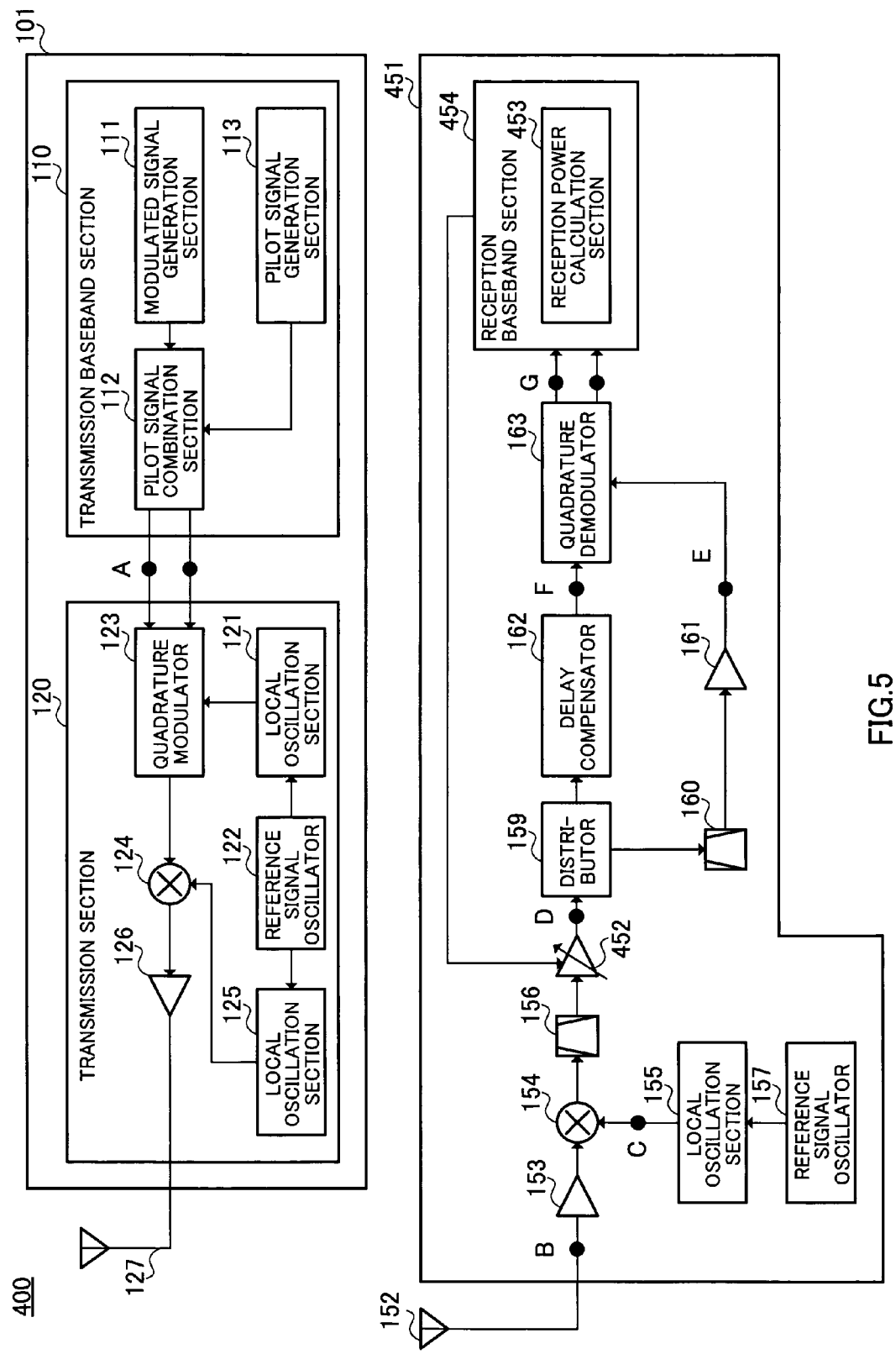
FIG. 5 is a block diagram showing the configuration of a radio system according to Embodiment 3 of the present invention.

FIG. 5 is a block diagram showing the configuration of a radio system according to this Embodiment 3. Compared to radio reception apparatus 151 of radio system 100 in Embodiment 1, radio reception apparatus 451 of radio system 400 shown in FIG. 5 only differs in that variable gain amplifier 452 is added instead of amplifier 158 and reception baseband section 164 is replaced by reception baseband section 454 provided with reception power calculation section 453 and the rest of the components are the same. Therefore, explanations of the same components will be omitted and only different parts will be explained below.

Here, when power received by antenna 152 fluctuates, power input to amplifier 161 fluctuates. When a delay generated in the pilot branch fluctuates, the delay value of delay compensator 162 cannot be uniquely determined. Noting such a point, this embodiment adds variable gain amplifier 452 instead of amplifier 158 and provides reception baseband section 454 equipped with reception power calculation section 453 instead of reception baseband section 164.

This reception power calculation section 453 calculates power of received signal B from power of signal G output from quadrature demodulator 163. Reception baseband section 454 gives a control signal corresponding to this calculation result to variable gain amplifier 452 and controls the gain thereof. This makes it possible to keep constant power input to distributor 159, and as a result, make constant the delay generated in the pilot branch and thereby uniquely determine the delay value of delay compensator 162.

As described above, it is possible to realize a radio system having an excellent phase noise characteristic even when the reception power changes.

In this way, according to Embodiment 3, radio reception apparatus 451 is provided with antenna 152 that receives a radio signal in which a modulated signal without the signal being carried on the center frequency is multiplexed with a pilot signal having a center frequency identical to the center frequency, distributor 159 that distributes the received signal received from antenna 152 into two directions, bandpass filter 160 that extracts from the one received signal distributed from distributor 159 a signal component corresponding to the pilot signal having a center frequency identical to the center frequency thereof, delay compensator 162 that gives a delay to the other signal distributed by distributor 159, and quadrature demodulator 163 that frequency-multiplies the signal component corresponding to the pilot signal extracted by band pass filter 160 by the other signal with a delay added by delay compensator 162 and also performs quadrature demodulation.

Furthermore, radio reception apparatus 451 is provided with reception power calculation section 453 that calculates a reception power value of the received signal based on the amplitude of the output signal of quadrature demodulator 163 and variable gain amplifier 452 that is disposed before distributor 159 and amplifies the received signal according to the calculated reception power value.

By so doing, even when the reception power received by antenna 152 fluctuates, it is possible to realize amplification according to the reception power value, keep constant the power input to distributor 159 and as a result keep constant the delay generated in the pilot branch. Therefore, it is possible to prevent deterioration of the phase noise characteristic even when the reception power fluctuates.

Embodiment 4

Figure 6:
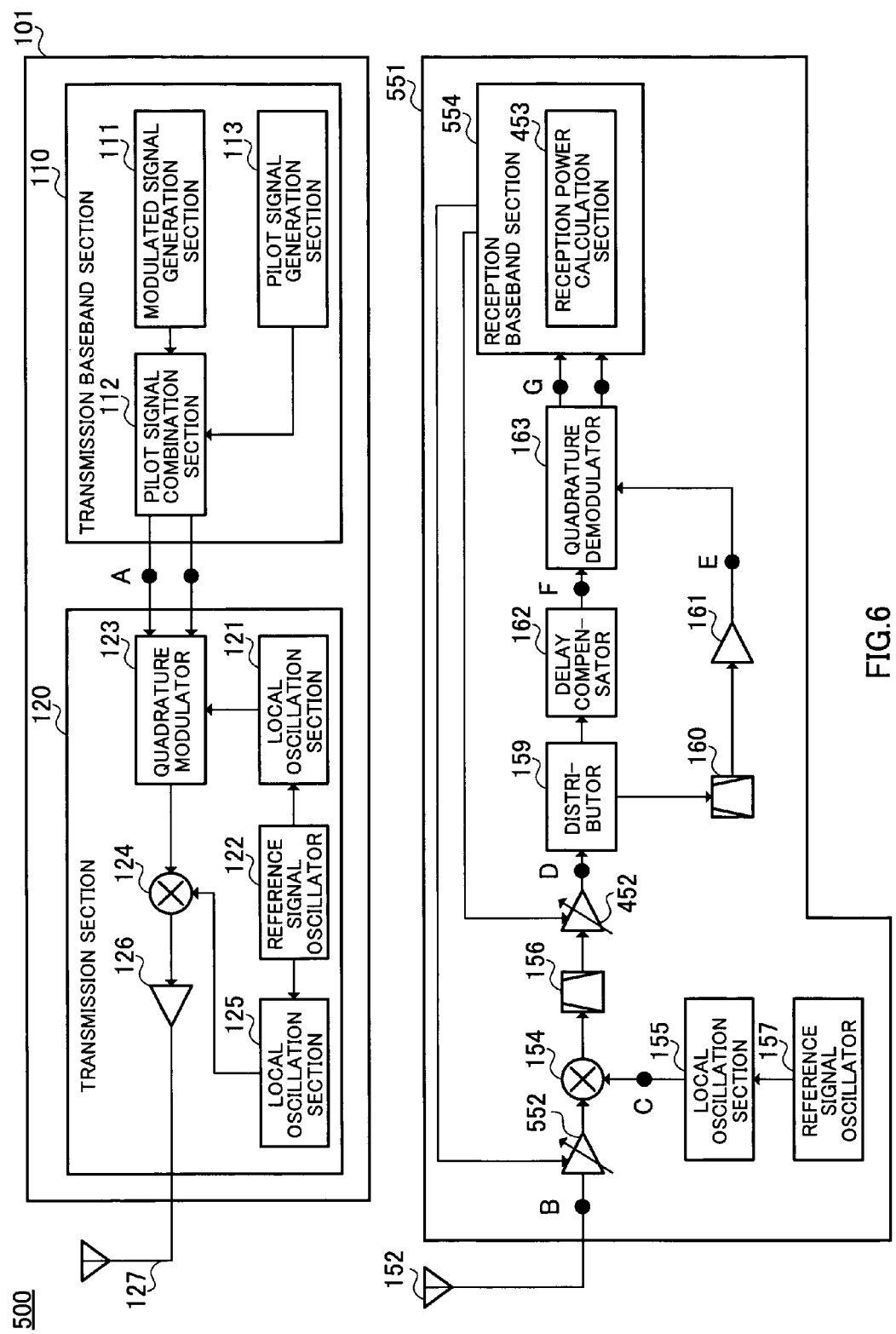
FIG. 6 is a block diagram showing the configuration of a radio system according to Embodiment 4 of the present invention.

FIG. 6 is a block diagram showing the configuration of a radio system according to this Embodiment 4. Compared to radio reception apparatus 451 of radio system 400 in Embodiment 3, radio reception apparatus 551 of radio system 500 shown in FIG. 6 only differs in that amplifier 153 is replaced by variable gain amplifier 552 and reception baseband section 454 is replaced by reception baseband section 554 and the rest of the components are the same. Therefore, explanations of the same components will be omitted and only different parts will be explained below.

Reception baseband section 554 receives signal G from quadrature demodulator 163 and reception power calculation section 453 calculates power of received signal B from the power of signal G. Reception baseband section 554 then gives control signals according to this calculation result to variable gain amplifier 552 and variable gain amplifier 452 and controls those gains.

By so doing, when the variable gain width of variable gain amplifier 452 is set to G1 dB and the variable gain width of variable gain amplifier 552 is set to G2 dB, the variable gain width of the entire system becomes (G1+G2) dB and it is possible to respond to fluctuations in the reception level with a further wider range.

As described above, even when the reception power fluctuates over a wide range, it is possible to realize a radio system with an excellent phase noise characteristic.

Embodiment 5

Figure 7:
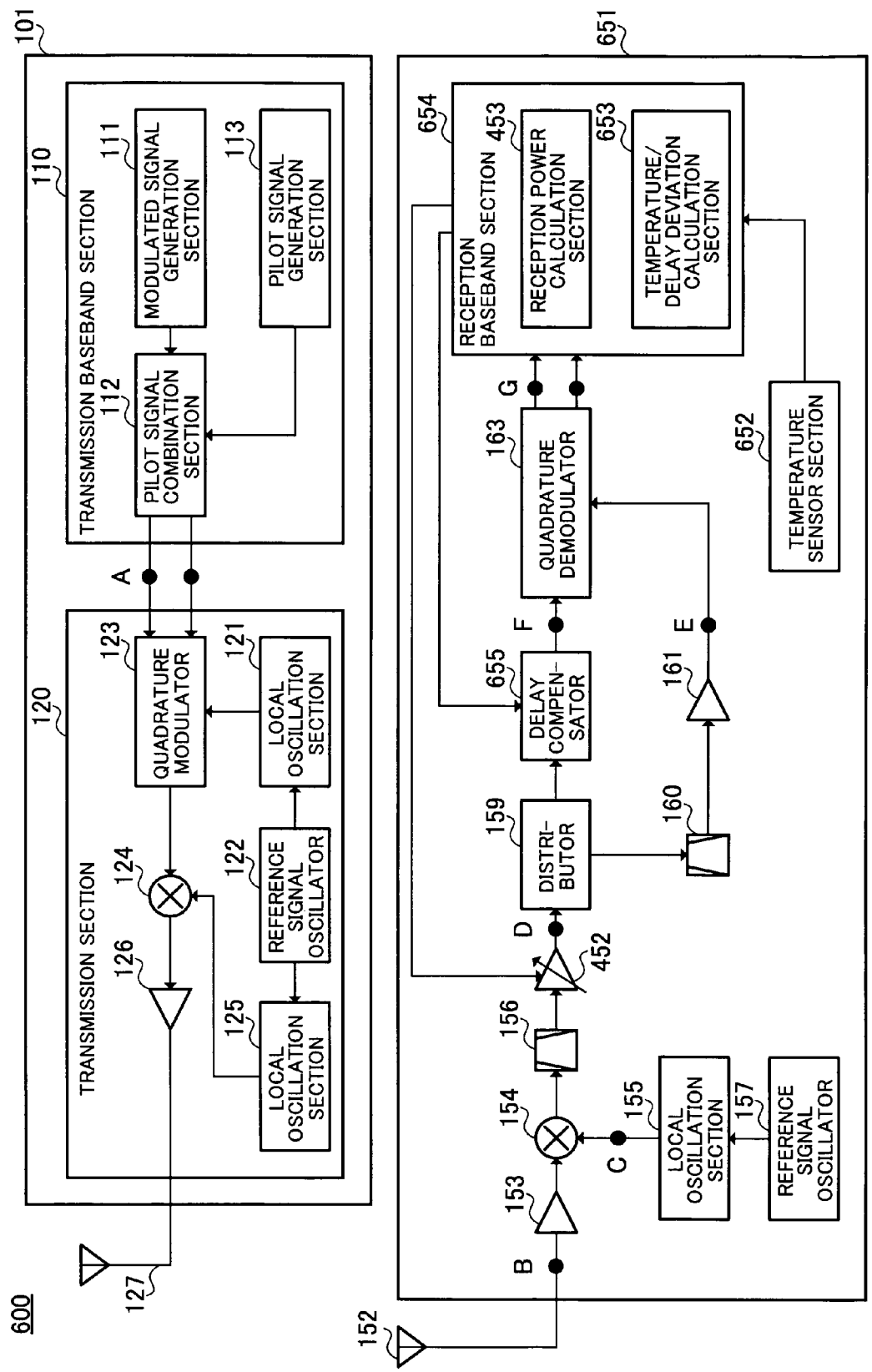
FIG. 7 is a block diagram showing the configuration of a radio system according to Embodiment 5 of the present invention.

FIG. 7 is a block diagram showing the configuration of a radio system according to Embodiment 5. Compared to radio reception apparatus 451 of radio system 400 in Embodiment 3, radio reception apparatus 651 of radio system 600 shown in FIG. 7 only differs in that temperature sensor section 652 is provided, reception baseband section 454 is replaced by reception baseband section 654 provided with reception power calculation section 453 and temperature/delay deviation calculation section 653 and delay compensator 162 is replaced by delay compensator 655, and the rest of the components are the same. Therefore, explanations of the same components will be omitted and only different parts will be explained below.

Noting that a delay variation according to temperature at amplifier 161 becomes an error when phase noise is canceled, this embodiment provides temperature sensor section 652, temperature/delay deviation calculation section 653 and delay compensator 655.

Reception baseband section 654 stores measured values of delay deviation with respect to the temperature of amplifier 161.

Temperature/delay deviation calculation section 653 provided for this reception baseband section 654 calculates a delay deviation based on temperature data measured by temperature sensor section 652. Reception baseband section 654 gives a control signal according to this calculation result to delay compensator 655 and controls the delay value of delay compensator 655.

Here, the case where radio reception apparatus 451 of Embodiment 3 is provided with temperature sensor section 652, temperature/delay deviation calculation section 653 and delay compensator 655 has been explained, but this is also applicable to any one of Embodiments 1 to 4.

As described above, even when the delay of the amplifier fluctuates depending on the temperature, it is possible to realize a radio system with an excellent phase noise characteristic.

In this way, according to Embodiment 5, radio reception apparatus 651 is provided with antenna 152 that receives a radio signal in which a modulated signal without the signal being carried on the center frequency is multiplexed with a pilot signal having a center frequency identical to the center frequency, distributor 159 that distributes the received signal received from antenna 152 into two directions, bandpass filter 160 that extracts from the one received signal distributed from distributor 159 a signal component corresponding to the pilot signal having a center frequency identical to the center frequency thereof, delay compensator 162 that gives a delay to the other signal distributed by distributor 159, and quadrature demodulator 163 that frequency-multiplies the signal component corresponding to the pilot signal extracted by band pass filter 160 by the other signal with a delay added by delay compensator 162 and also performs quadrature demodulation.

Furthermore, radio reception apparatus 651 is provided with temperature sensor section 652 that measures a temperature and temperature/delay deviation calculation section 653 that calculates an amount of delay based on the temperature and delay compensator 655 changes the delay to be added based on the calculated amount of delay.

By so doing, even when the delay of the amplifier in the pilot branch fluctuates according to the temperature, delay compensator 655 can compensate for the delay according to the delay variation, and therefore it is possible to match the phases of input signals for quadrature demodulator 163 and thereby improve the phase noise characteristic.

Embodiment 6

Figure 8:
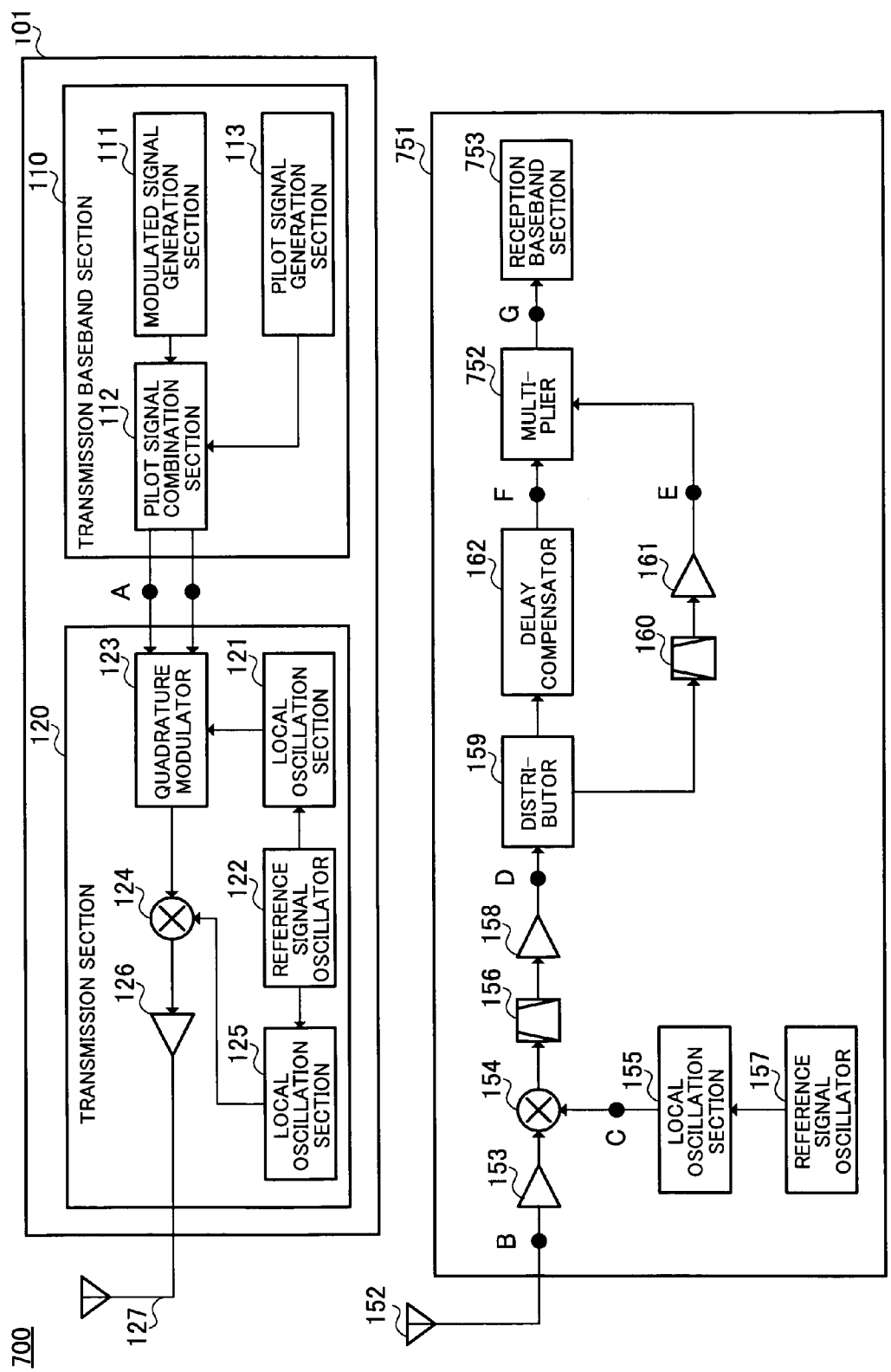
FIG. 8 is a block diagram showing the configuration of a radio system according to Embodiment 6 of the present invention.
Figure 9:
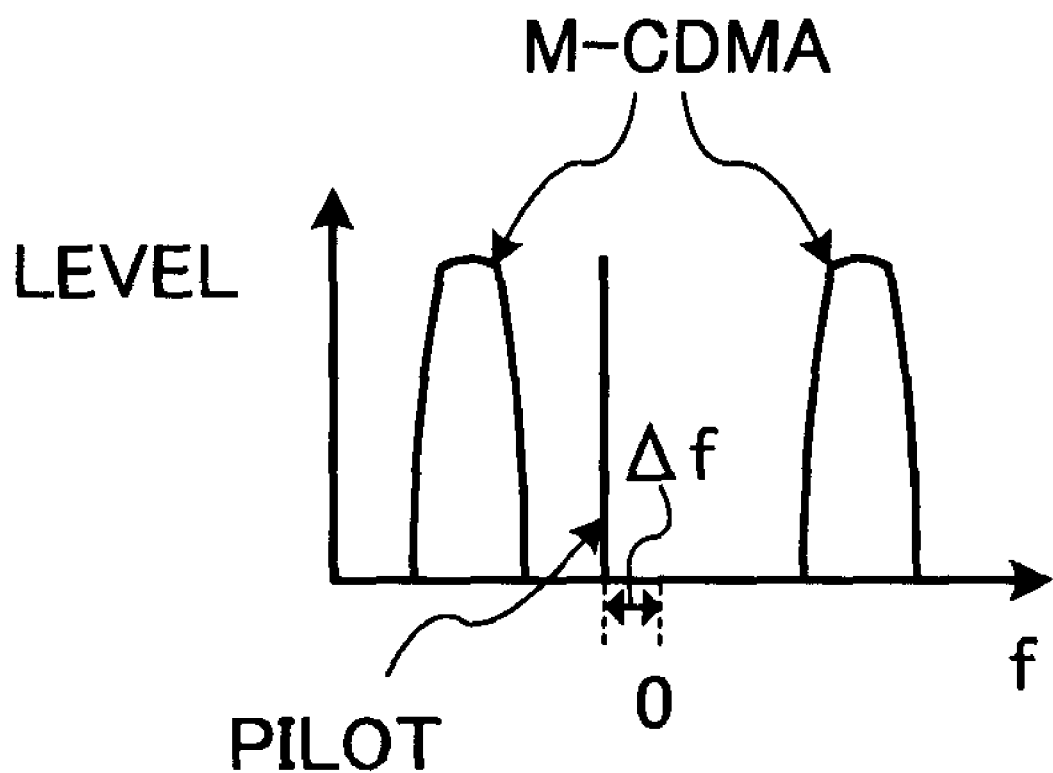
FIG. 9 illustrates a frequency characteristic of a transmission signal in the radio system of FIG. 8.

FIG. 8 is a block diagram showing the configuration of a radio system according to this Embodiment 6. Compared to radio reception apparatus 151 of radio system 100 according to Embodiment 1, radio reception apparatus 751 of radio system 700 shown in FIG. 8 only differs in that quadrature demodulator 163 is replaced by multiplier 752 and reception baseband section 164 is replaced by reception baseband section 753, and the rest of the components are the same. Furthermore, this embodiment differs only in that a pilot signal superimposed on a transmission signal is multiplexed in the vicinity of the center of a modulated signal, that is, on a frequency shifted by $\Delta f$ from the center as shown in FIG. 9. Therefore, explanations of the same components will be omitted and only different parts will be explained below.

Multiplier 752 multiplies signal E amplified by amplifier 161 and signal F with a delay added thereto by delay compensator 162 and outputs the multiplication result to reception baseband section 753. Band pass filter 160 is adjusted so as to extract a pilot signal component having a frequency shifted by $\Delta f$ from the above described center from the signal distributed by distributor 159.

Here, signal G output from multiplier 752 can be expressed as follows:

$$(f_{RF}-f_{LO1})-(f_{RF\_PILOT}f_{LO1})$$

$$=(f_{RF}-f_{LO1})-(f_{RF}-\Delta f-f_{LO1})\angle$$

$$\theta(t-\tau_1-\tau_2)-\phi(t-\tau_1-\tau_2)-\{\theta(t-\Delta t)-\Delta\theta(t-\Delta t)-\phi(t-\Delta t)\}$$

This is organized using a condition of $f_{PILOT}=0$ Hz and $\Delta t=\tau_1+\tau_2$ as follows:

$$f_{CDMA}+\Delta f\angle\Delta\theta(t-\Delta t)$$

Reception baseband section 753 applies predetermined processing to the output signal of this multiplier 752 and obtains a baseband signal.

Here, when the frequency of $\Delta f$ is set to a frequency lower than the RF frequency and IF frequency, phase noise $\Delta\theta(t-\Delta t)$ becomes a very small value, and therefore there is substantially no influence on the reception characteristic of reception baseband section 753. For this reason, this embodiment is suitably applicable to a Low-IF scheme or the like whereby demodulation is performed using a low frequency signal.

Thus, adopting the configuration of multiplexing a pilot signal to be superimposed on the transmission signal with the modulated signal in the vicinity of the center thereof and using multiplier 752 instead of quadrature demodulator 163 makes it possible to support a reception scheme such as a Low-IF scheme. It is also possible to realize a radio system having an excellent phase noise characteristic. This configuration is also applicable to each radio reception apparatus of the radio system of Embodiment 2 to Embodiment 5.

Embodiment 7

Figure 10:
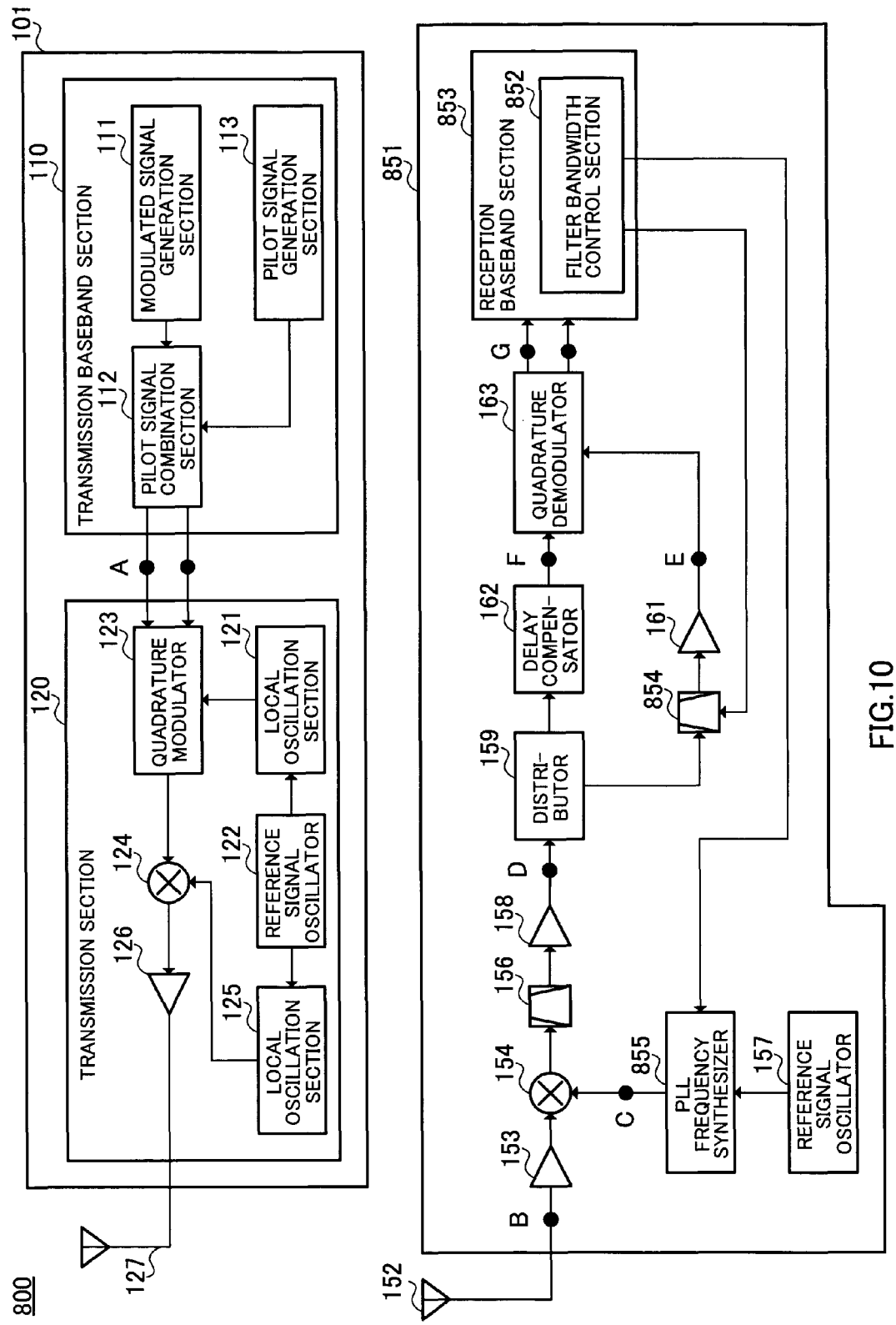
FIG. 10 is a block diagram showing the configuration of a radio system according to Embodiment 7 of the present invention.

FIG. 10 is a block diagram showing the configuration of a radio system according to this Embodiment 7. Compared to radio reception apparatus 151 of radio system 100 according to Embodiment 1, radio reception apparatus 851 of radio system 800 shown in FIG. 10 only differs in that reception baseband section 164 is replaced by reception baseband section 853 provided with filter bandwidth control section 852, band pass filter 160 is replaced by bandwidth variable band pass filter 854 and local oscillation section 155 is replaced by PLL frequency synthesizer 855, and the rest of the components are the same. Therefore, explanations of the same components will be omitted and only different parts will be explained below.

Filter bandwidth control section 852 controls the bandwidth of bandwidth variable band pass filter 854 by giving a signal to control the bandwidth.

In this way, even when the distance between the frequency of the modulated signal and the frequency of the pilot signal is changed, it is possible to extract the pilot signal by controlling the bandwidth of bandwidth variable band pass filter 854 using filter bandwidth control section 852.

However, since it is not possible to extract phase noise outside the frequency band of bandwidth variable band pass filter 854, the phase noise suppression characteristic deteriorates.

Thus, if local oscillation section 155 is replaced by PLL frequency synthesizer 855, filter bandwidth control section 852 controls the loop bandwidth of PLL frequency synthesizer 855 and the loop bandwidth is set to or below the bandwidth of bandwidth variable band pass filter 854, it is possible to suppress phase noise within the band of bandwidth variable band pass filter 854.

In this way, by controlling the bandwidth of bandwidth variable band pass filter 854 and the loop bandwidth of PLL frequency synthesizer 855, it is possible to suppress influences of phase noise outside the bandwidth variable band pass filter 854. This configuration is also applicable to the radio reception apparatus in the radio system according to Embodiment 2 to Embodiment 6.

Thus, even when the distance between the frequency of the modulated signal and the frequency of the pilot signal is changed, it is possible to realize a radio system having an excellent phase noise characteristic. Furthermore, by adopting such a configuration for the radio system of the present invention, the present invention is also applicable to a plurality of communication systems having different distances between the frequency of the modulated signal and frequency of the pilot signal.

In this way, according to Embodiment 7, radio reception apparatus 851 is provided with antenna 152 that receives a radio signal in which a modulated signal without the signal being carried on the center frequency is multiplexed with a pilot signal having a center frequency identical to the center frequency, distributor 159 that distributes the received signal received from antenna 152 into two directions, bandpass filter 160 that extracts from the one received signal distributed from distributor 159 a signal component corresponding to the pilot signal having a center frequency identical to the center frequency thereof, delay compensator 162 that gives a delay to the other signal distributed by distributor 159, and quadrature demodulator 163 that frequency-multiplies the signal component corresponding to the pilot signal extracted by band pass filter 160 by the other signal with a delay added by delay compensator 162 and also performs quadrature demodulation.

Furthermore, a superheterodyne scheme is applied to radio reception apparatus 851 and radio reception apparatus 851 is provided with filter bandwidth control section 852 that generates a control signal for controlling the filter bandwidth, PLL frequency synthesizer 855 that controls and oscillates the bandwidth of a local oscillation signal based on the control signal and multiplier 154 that is disposed before distributor 159 and frequency-multiplies the received signal received by antenna 152 and the local oscillation signal whose bandwidth is controlled by PLL frequency synthesizer 855, and bandwidth variable band pass filter 854 is made to change the bandwidth to be extracted based on the above described control signal.

By so doing, it is possible to suppress influences of phase noise outside the bandwidth of bandwidth variable band pass filter 854 by controlling the bandwidth of bandwidth variable band pass filter 854 and loop bandwidth of PLL frequency synthesizer 855 and improve the phase noise characteristic. Furthermore, this embodiment is also applicable to the case where signals with a different distance between the frequency of the modulated signal and the frequency of the pilot signal are received.

Embodiment 8

Figure 11:
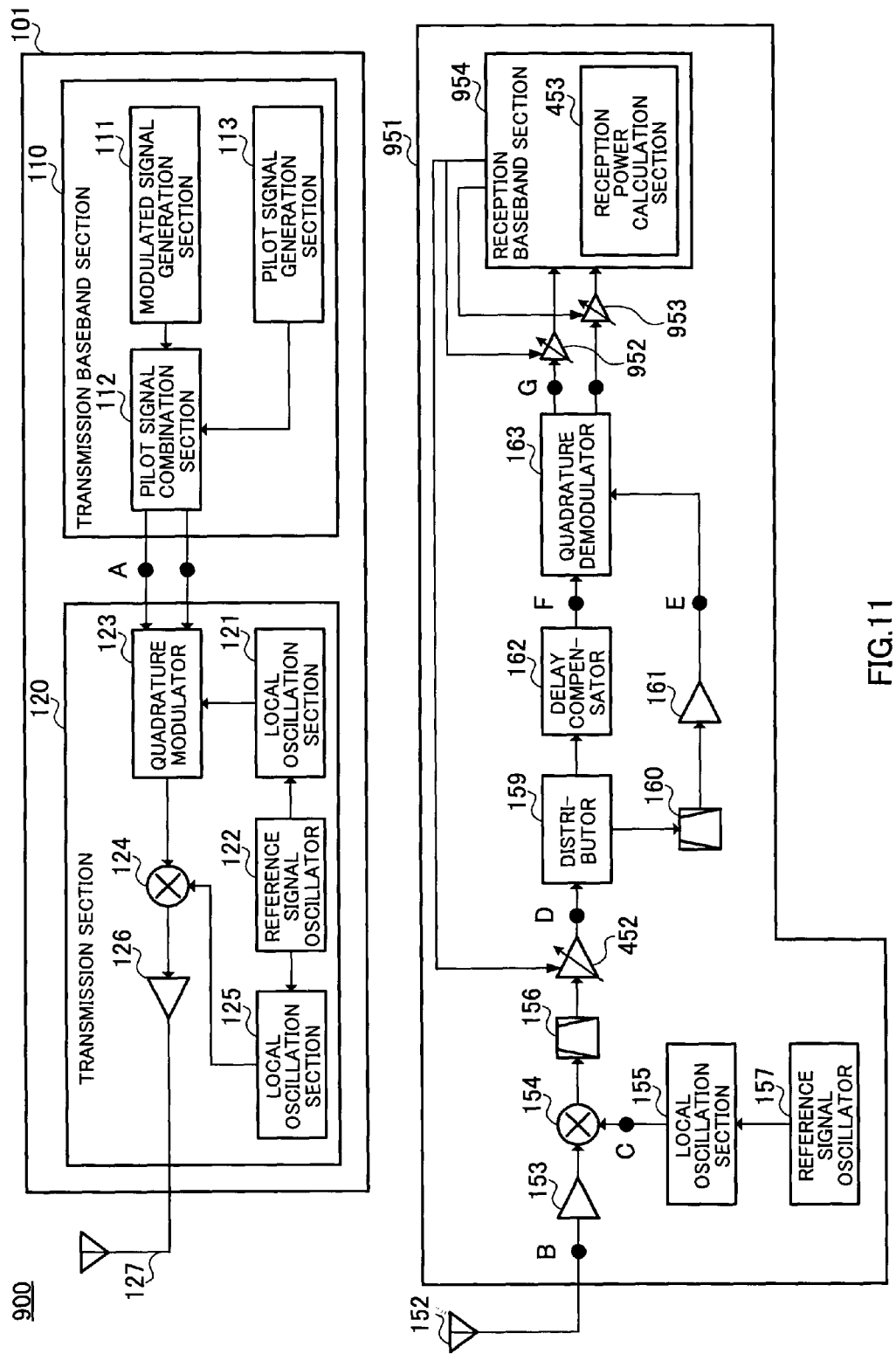
FIG. 11 is a block diagram showing the configuration of a radio system according to Embodiment 8 of the present invention.

FIG. 11 is a block diagram showing the configuration of a radio system according to this Embodiment 8. Compared to radio reception apparatus 451 of radio system 400 according to Embodiment 3, radio reception apparatus 951 of radio system 900 shown in FIG. 11 only differs in that variable gain amplifier 952 and variable gain amplifier 953 are added after quadrature demodulator 163 and reception baseband section 454 is replaced by reception baseband section 954, and the rest of the components are the same. Therefore, explanations of the same components will be omitted and only different parts will be explained below.

Reception baseband section 954 receives signal G from quadrature demodulator 163 and reception power calculation section 453 calculates power of signal G. Reception baseband section 954 gives control signals according to this calculation result to variable gain amplifier 952 and variable gain amplifier 953 and controls those gains.

By so doing, when the variable gain width of variable gain amplifier 452 is set to G1 dB and the variable gain width of variable gain amplifier 952 and variable gain width of variable gain amplifier 953 are set to G3 dB, the variable gain width of the entire system becomes (G1+G3) dB and it is possible to cover fluctuations in the reception level over a further wider range.

This embodiment has explained the case where variable gain amplifier 952 and variable gain amplifier 953 are added after quadrature demodulator 163 of Embodiment 3, but the embodiment is also applicable to any of Embodiment 4 and Embodiment 5.

In this way, according to Embodiment 8, radio reception apparatus 951 is provided with antenna 152 that receives a radio signal in which a modulated signal without the signal being carried on the center frequency is multiplexed with a pilot signal having a center frequency identical to the center frequency, distributor 159 that distributes the received signal received from antenna 152 into two directions, bandpass filter 160 that extracts from the one received signal distributed from distributor 159 a signal component corresponding to the pilot signal having a center frequency identical to the center frequency thereof, delay compensator 162 that gives a delay to the other signal distributed by distributor 159, and quadrature demodulator 163 that frequency-multiplies the signal component corresponding to the pilot signal extracted by band pass filter 160 by the other signal with a delay added by delay compensator 162 and also performs quadrature demodulation.

Furthermore, radio reception apparatus 951 is provided with reception power calculation section 453 that calculates a reception power value of the received signal based on the amplitude of an output signal of quadrature demodulator 163, and variable gain amplifier 952 and variable gain amplifier 953 that amplify the signal subjected to quadrature demodulation by quadrature demodulator 163 according to the calculated reception power value.

By so doing, even when the reception power fluctuates over a wide range, it is possible to prevent deterioration of the phase noise characteristic.

Embodiment 9

Figure 12:
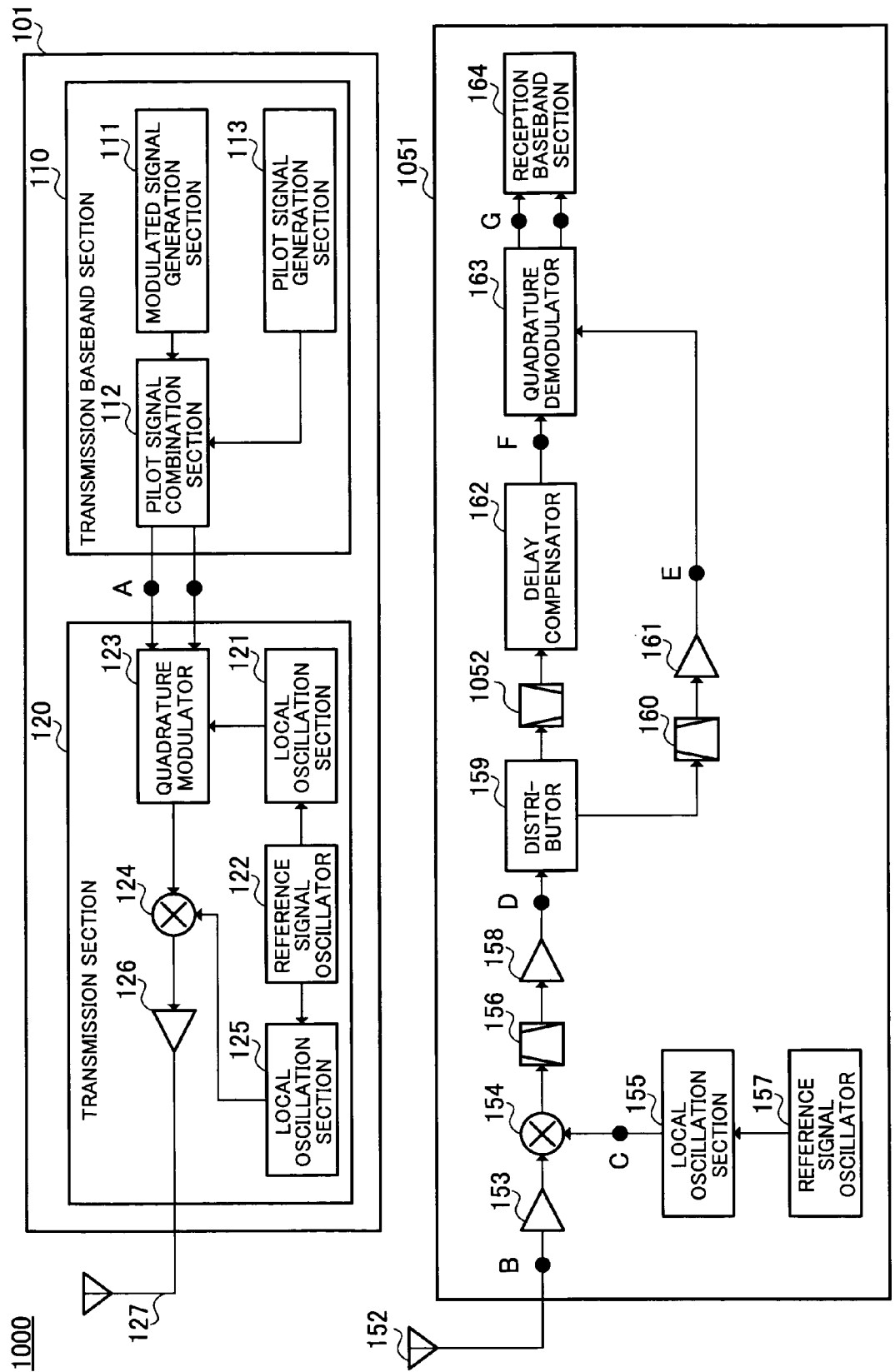
FIG. 12 is a block diagram showing the configuration of a radio system according to Embodiment 9 of the present invention.

FIG. 12 is block diagram showing the configuration of a radio system according to Embodiment 9. Compared to radio reception apparatus 151 according to Embodiment 1, radio reception apparatus 1051 of radio system 1000 shown in FIG. 12 differs in that band limiting filter 1052 is provided after distributor 159, and the rest of the components are the same. Therefore, explanations of the same components will be omitted and only different parts will be explained below.

Here, when a pilot signal component is carried on a center frequency as in the case of signal D, DC offset may have occurred and there is a possibility that the reception characteristic may deteriorate.

Thus, band limiting filter 1052 is set so as to remove only a pilot signal component from the signal received from distributor 159. For this reason, signal F which is the output signal from delay compensator 162 in this embodiment has no peak corresponding to a pilot signal component in the center frequency area.

Quadrature demodulator 163 then multiplies signal F deprived of the peak corresponding to the pilot signal component in the center frequency area by signal E, then performs quadrature demodulation and gives the signal to reception baseband section 164. By so doing, a peak corresponding to the pilot signal component in the center frequency area in the signal input to quadrature demodulator 163 is removed by band limiting filter 1052 in the modulated signal branch, and it is thereby possible to remove influences of a DC offset in the signal input to quadrature demodulator 163. For this reason, it is possible to prevent distortion from occurring in the signal input from quadrature demodulator 163 to reception baseband section 164 and thereby improve the reception characteristic. That is, by preventing distortion caused by a DC offset from occurring, it is possible to improve the reception characteristic.

In this way, according to Embodiment 9, radio reception apparatus 1051 is provided with antenna 152 that receives a radio signal in which a modulated signal without the signal being carried on the center frequency is multiplexed with a pilot signal having a center frequency identical to the center frequency, distributor 159 that distributes the received signal received from antenna 152 into two directions, band pass filter 160 that extracts from the one received signal distributed from distributor 159 a signal component corresponding to the pilot signal having a center frequency identical to the center frequency thereof, delay compensator 162 that gives a delay to the other signal distributed by distributor 159, and quadrature demodulator 163 that frequency-multiplies the signal component corresponding to the pilot signal extracted by band pass filter 160 by the other signal with a delay added by delay compensator 162 and also performs quadrature demodulation.

Furthermore, radio reception apparatus 1051 is provided with band limiting filter 1052 that is disposed before delay compensator 162 and removes a signal component corresponding to a pilot signal having a center frequency identical to the center frequency of the signal distributed by distributor 159 from the signal.

This removes a peak corresponding to the pilot signal component in the center frequency area of the signal input from band limiting filter 1052 to quadrature demodulator 163, and can thereby remove influences of a DC offset in the signal input to quadrature demodulator 163. For this reason, it is possible to prevent distortion from occurring in the signal input from quadrature demodulator 163 to reception baseband section 164 and thereby improve the reception characteristic.

Embodiment 10

This embodiment relates to a radio transmission apparatus having a configuration different from that of radio transmission apparatus 101 according to Embodiment 1 to Embodiment 9. Transmission baseband section 110 of radio communication apparatus 101 multiplexes a pilot signal so as to be positioned at the center of the modulated signal on the frequency axis, and therefore there is a possibility that a DC offset may have occurred in the signal input from transmission baseband section 110 to quadrature modulator 123 and the reception characteristic on the receiving side may deteriorate because of this. Therefore, this embodiment causes a pilot to be carried on the signal after quadrature modulation at the center of the frequency axis. Furthermore, a local oscillation signal is used as this pilot signal.

Figure 13:
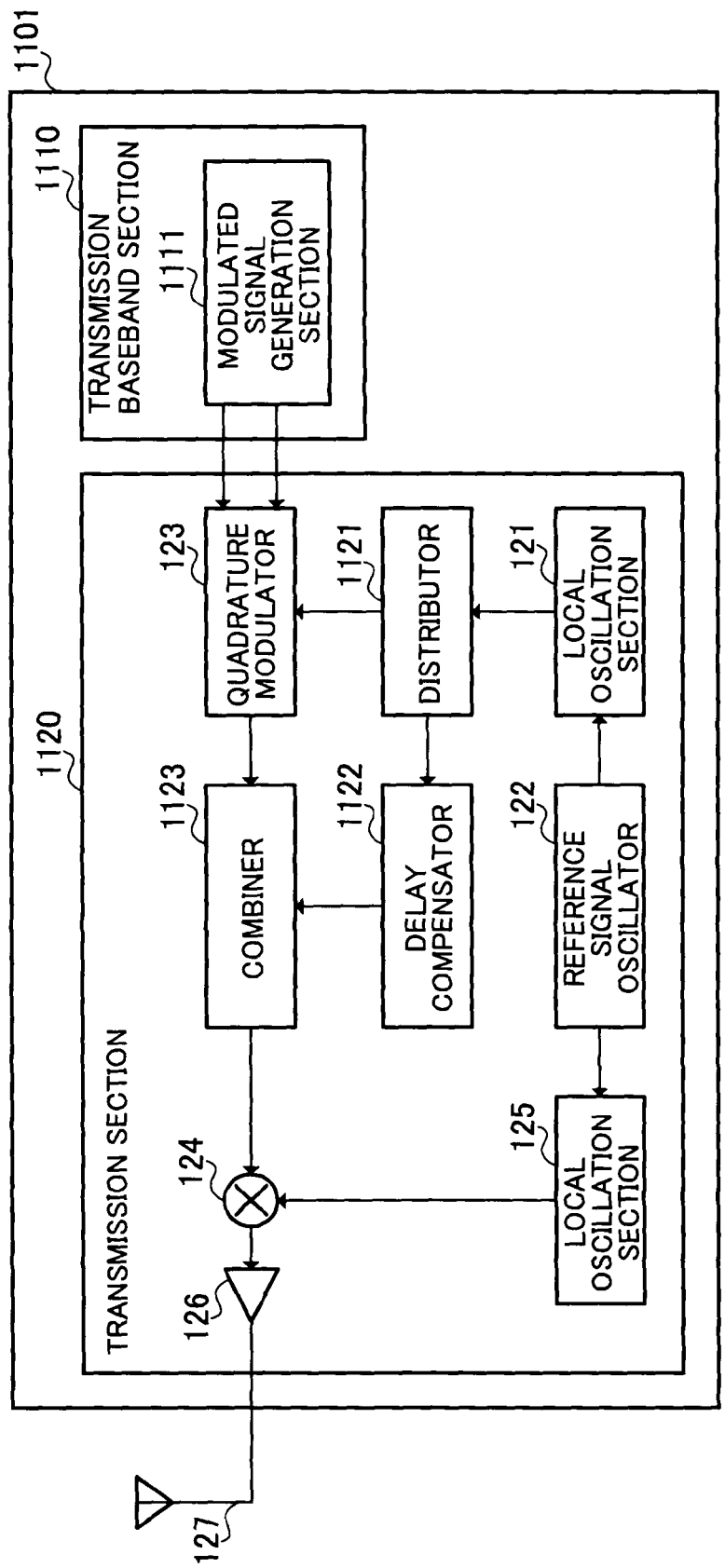
FIG. 13 is a block diagram showing the configuration of a radio transmission apparatus different from the configuration of the radio transmission apparatus shown in FIG. 1.
Figure 14:
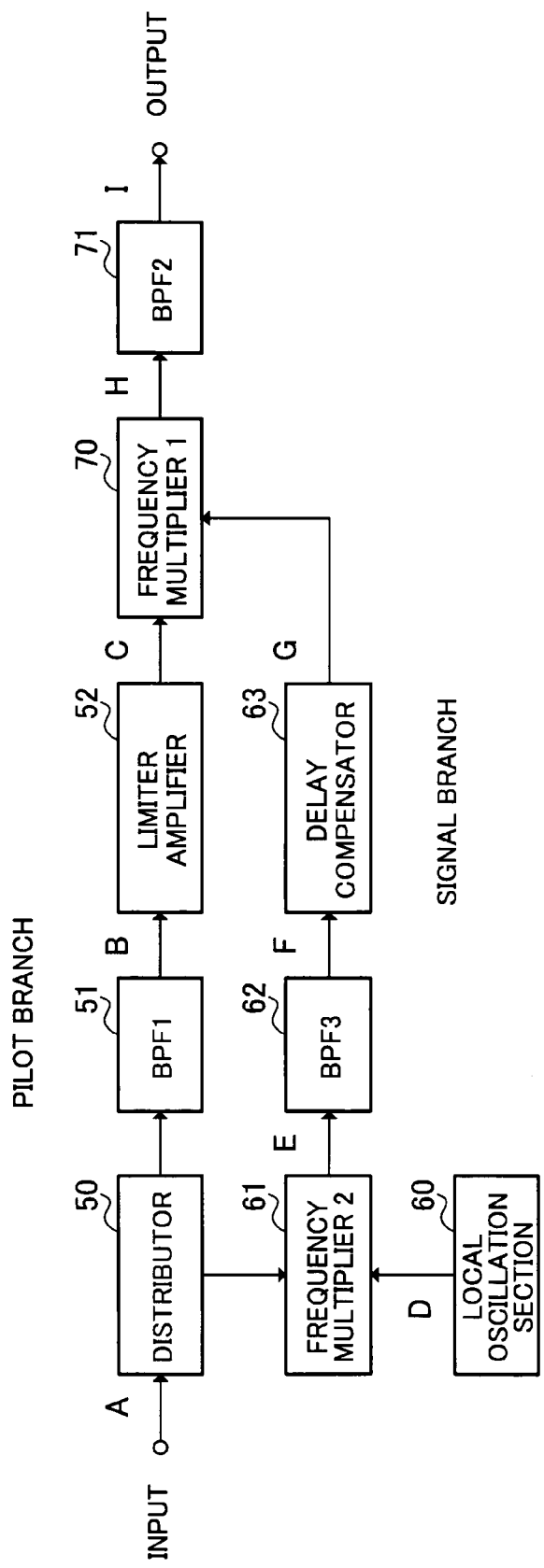
FIG. 14 is a block diagram showing the configuration of a local noise canceller provided for a conventional radio system.
Figure 15A:
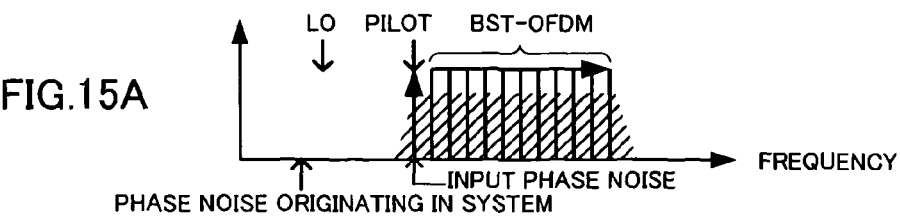
FIG. 15 shows characteristic diagram illustrating frequency characteristics of the respective components of the local noise canceller in FIG. 14.
Figure 15D:
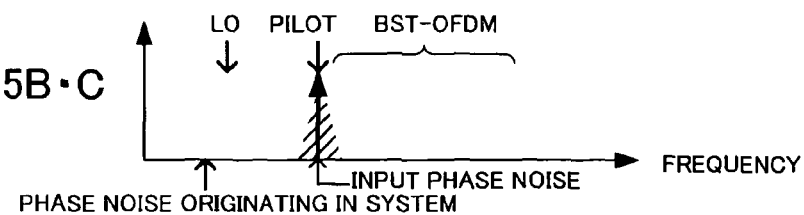
Figure 15D:
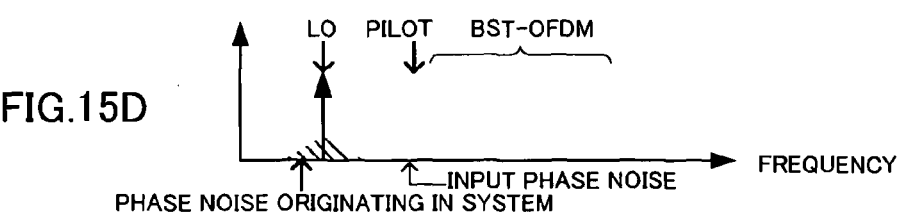
Figure 15E:
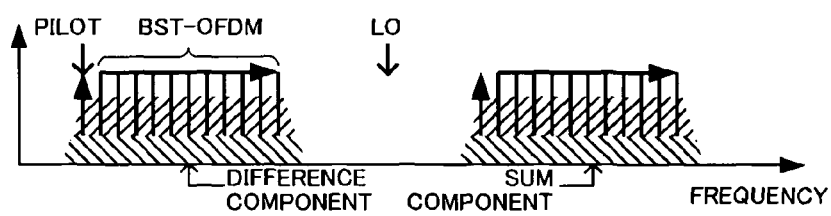
Figure 15F:
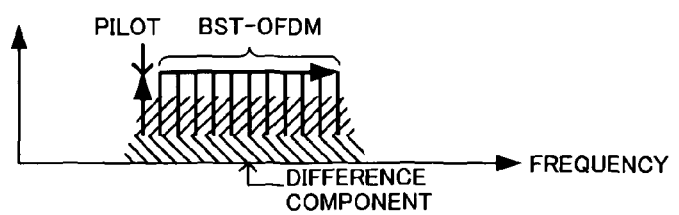
Figure 15G:
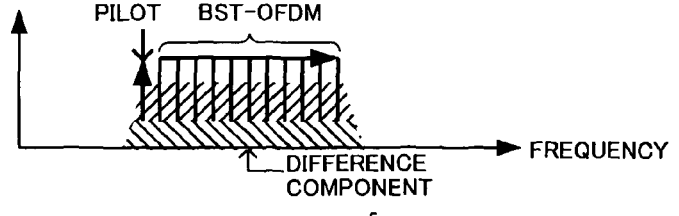
Figure 15H:
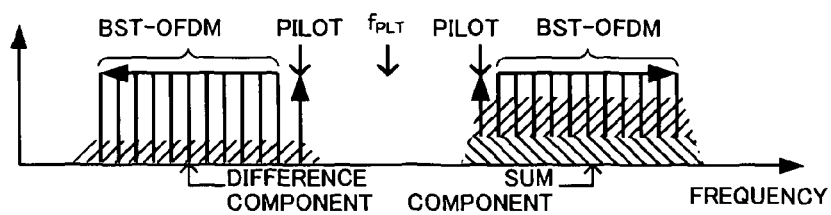
Figure 15:
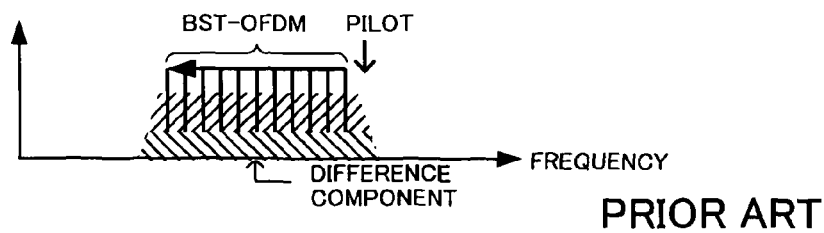

As shown in FIG. 13, radio transmission apparatus 1101 according to this embodiment is provided with transmission baseband section 1110 that generates a baseband signal and transmission section 1120 that applies predetermined processing to the baseband signal and sends it as an RF signal.

In this transmission baseband section 1110, modulated signal generation section 1111 generates a modulated signal and inputs an I component and Q component of the modulated signal to quadrature modulator 123 of transmission section 1120. Here, the modulated signal will be explained as multi-carrier CDMA, but any modulated signal can be handled if at least no signal is carried on the center frequency part on the frequency axis and, for example, an OFDM signal may also be used.

Distributor 1121 distributes a local oscillation signal from local oscillation section 121 and inputs it to quadrature modulator 123 and delay compensator 1122.

Delay compensator 1122 adds a delay in such a way that the time after a local oscillation signal distributed by distributor 1121 is input to quadrature modulator 123 until quadrature modulator 123 performs quadrature modulation on the modulated signal using the local oscillation signal and then the signal is input to combiner 1123 becomes the same as the time until the local oscillation signal distributed by distributor 1121 is input to the combiner 1123, that is, both signals have the same phase.

Combiner 1123 combines the output signal of quadrature modulator 123 and the output signal from delay compensator 1122 and inputs the combined signal to multiplier 124. At this time, the signal output from combiner 1123 has a local oscillation signal (generated by local oscillation section 121) as a pilot signal on the signal after quadrature modulation at the center of the frequency axis.

Thus, according to Embodiment 10, it is possible to generate and send a radio signal in which a modulated signal free of influences of a DC offset with the signal not being carried on the center frequency is multiplexed with a pilot signal having a center frequency identical to the center frequency thereof.

Other Embodiments (1) Radio transmission apparatus 101 and radio transmission apparatus 1101 according to Embodiment 1 to Embodiment 10 have been explained as the ones to which a superheterodyne scheme is applied. However, the present invention is not limited to this and a direct conversion scheme may also be applicable thereto. In this case, radio transmission apparatus 101 and radio transmission apparatus 1101 need not be provided with multiplier 124 and local oscillation section 125 and the output signal of quadrature modulator 123 has a radio frequency.

(2) The radio reception apparatus according to Embodiment 1 to Embodiment 9 has been explained as the one to which a superheterodyne scheme is applied. However, the present invention is not limited to this and a direct modulation scheme may also be applied. In this case, the radio reception apparatus according to the above described embodiments does not require multiplier 154, local oscillation section 155, band pass filter 156 and reference signal oscillator 157 and the input signal for distributor 159 has a radio frequency.

The present application is based on Japanese Patent Application No. 2004-089725 filed on Mar. 25, 2004 and Japanese Patent Application No. 2005-82443 filed on Mar. 22, 2005, entire content of which is expressly incorporated by reference herein.

INDUSTRIAL APPLICABILITY

The radio system, radio transmission apparatus and radio reception apparatus of the present invention has an effect of improving a phase noise characteristic and is useful for use in various radio communication apparatuses such as cellular phone, PHS, radio LAN and a radio system made up of these devices.

The invention claimed is:

1. A radio system comprising:
a radio transmission apparatus provided with a transmission section that transmits a radio signal which multiplexes a modulated signal without the signal being carried on a center frequency and a pilot signal having a center frequency identical to said center frequency; and
a radio reception apparatus provided with an antenna that receives said radio signal, a distribution section that distributes the received signal received by said antenna into two directions, an extraction section that extracts a signal component corresponding to said pilot signal from one received signal distributed by said distribution section and outputs the signal component, a delay addition section that gives a delay to the other received signal distributed by said distribution section and outputs the signal and a quadrature demodulation section that frequency-multiplies the output signal of said extraction section by the output signal of said delay addition section and carries out quadrature demodulation.

2. A radio reception apparatus comprising:
an antenna that receives a radio signal which multiplexes a modulated signal without the signal being carried on a center frequency and a pilot signal having a center frequency identical to said center frequency;
a distribution section that distributes the received signal received by said antenna into two directions;
an extraction section that extracts a signal component corresponding to the pilot signal having a center frequency identical to the center frequency from one signal distributed by said distribution section;
a delay addition section that gives a delay to the other received signal distributed by said distribution section; and a quadrature demodulation section that frequency-multiplies a signal component corresponding to said pilot signal extracted by said extraction section by said other signal with a delay added thereto by said delay addition section and carries out quadrature demodulation.

3. The radio reception apparatus according to claim 2, wherein said quadrature demodulation section comprises:
a phase shift section that applies a 90-degree phase shift to a signal component corresponding to said extracted pilot signal;
a first frequency multiplier that multiplies said other signal with said delay added thereto by a signal component corresponding to said pilot signal with said 90-degree phase shift applied thereto;
a second frequency multiplier that multiplies said other signal with said delay added thereto by a signal component corresponding to said pilot signal; and
another delay addition section that adds a delay equivalent to a delay generated by said phase shift section to a signal component corresponding to said pilot signal multiplied by said second frequency multiplier.

4. The radio reception apparatus according to claim 2, further comprising an amplification section that amplifies said one signal distributed by said distribution section and outputs the amplified signal to said extraction section.

5. The radio reception apparatus according to claim 2, further comprising:
a reception power calculation section that calculates a reception power value of said received signal based on amplitude of an output signal of said quadrature demodulation section; and
a variable gain amplification section that is disposed before said distribution section and amplifies said received signal according to said reception power value.

6. The radio reception apparatus according to claim 2, further comprising:
a temperature measuring section that measures a temperature; and
a delay amount calculation section that calculates an amount of delay based on said temperature,
wherein said delay addition section changes a delay to be added based on said amount of delay calculated.

7. The radio reception apparatus according to claim 2, wherein said quadrature demodulation section is used as a frequency multiplication section that frequency-multiplies a signal component corresponding to said pilot signal extracted by said extraction section by an output signal of said delay addition section.

8. The radio reception apparatus according to claim 2 to which a superheterodyne scheme is applied, further comprising:
- a filter bandwidth control section that generates a control signal for controlling a filter bandwidth;
- a local signal oscillation section that controls and oscillates a bandwidth of a local oscillation signal based on said control signal; and
- a frequency multiplication section that is disposed before said distribution section and frequency-multiplies said received signal by a local oscillation signal whose said bandwidth is controlled,
- wherein said extraction section changes the bandwidth to be extracted based on said control signal.

9. The radio reception apparatus according to claim 2, further comprising:
- a reception power calculation section that calculates a reception power value of said received signal based on amplitude of an output signal of said quadrature demodulation section; and
- a variable gain amplification section that amplifies a signal subjected to quadrature demodulation by the quadrature demodulation section according to said reception power value.

10. The radio reception apparatus according to claim 2, further comprising a band limiting filter that is disposed before said delay addition section that removes a signal component corresponding to a pilot signal having a center frequency identical to the center frequency of said other signal distributed by said distribution section from said other signal.

11. A radio transmission apparatus that transmits a multiplexed signal which multiplexes a modulated signal without the signal being carried on a center frequency and a pilot signal having a center frequency identical to said center frequency, comprising:
- a modulated signal generation section that generates said modulated signal;
- a local oscillation signal generation section that generates a local oscillation signal;
- a quadrature modulation section that frequency-multiplies said modulated signal using said local oscillation signal generated by said local oscillation signal generation section, increases the frequency and performs quadrature modulation;
- a delay addition section that adds a delay to said local oscillation signal generated by said local oscillation signal generation section; and
- a combiner that multiplexes a signal after said quadrature modulation by said quadrature modulation section with a local oscillation signal as said pilot signal with a delay added by said delay addition section so that the phases of the signals match after said quadrature modulation.

* * * * *